(12) United States Patent
Boatner et al.

(10) Patent No.: US 11,356,543 B2
(45) Date of Patent: Jun. 7, 2022

(54) IMAGE MODULE INCLUDING MOUNTING AND DECODER FOR MOBILE DEVICES

(71) Applicant: Cognex Corporation, Natick, MA (US)

(72) Inventors: John Bryan Boatner, Natick, MA (US); Kai Fluegge, Aachen (DE); Mario Joussen, Nideggen (DE); Laurens Nunnink, Simpleveld (NL); Carl W. Gerst, III, Natick, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 16/297,633

(22) Filed: Mar. 9, 2019

(65) Prior Publication Data
US 2020/0076934 A1    Mar. 5, 2020

Related U.S. Application Data

(63) Continuation-in-part of application No. 14/550,709, filed on Nov. 21, 2014, now abandoned, and a
(Continued)

(51) Int. Cl.
*H04N 5/225* (2006.01)
*H04N 5/232* (2006.01)
(Continued)

(52) U.S. Cl.
CPC ........ *H04M 1/0274* (2013.01); *H04B 1/3883* (2013.01); *H04M 1/0264* (2013.01);
(Continued)

(58) Field of Classification Search
CPC .... G06K 7/10881; G06K 7/12; G07G 1/0081; G06F 1/1632; G06F 1/3203;
(Continued)

(56) References Cited

U.S. PATENT DOCUMENTS

| 4,130,738 A | 12/1978 | Sandstedt |
| 4,953,123 A | 8/1990 | Takeuchi |

(Continued)

FOREIGN PATENT DOCUMENTS

| CN | 103336553 A | 10/2013 |
| CN | 203734726 U | 3/2014 |

(Continued)

*Primary Examiner* — Thien T Mai
(74) *Attorney, Agent, or Firm* — Loginov & Associates, PLLC; William A Loginov

(57) ABSTRACT

This invention provides a module/base assembly for a handheld device. The module includes an imager with optics and image acquisition/processing processors that provide high speed acquisition and handling of acquired image data. The acquired image data is processed by the device processor using a module application that resides within the device. A removable retaining component mounts within the base. The base houses a battery and charging assembly e.g. an inductive charging unit. The inductive charging unit can be adapted to pass data, in addition to power, between the inductive coils and the charging unit can be interconnected to a data network with attached devices that employ data from the module. The base can charge the device via a connector and/or wireless charging arrangement. Data communication between the base and mobile device can occur using an RF link, e.g. an integrated Bluetooth® functionality.

19 Claims, 29 Drawing Sheets

Related U.S. Application Data continuation-in-part of application No. 14/137,975, filed on Dec. 20, 2013, now Pat. No. 10,229,303.

(51) Int. Cl.
  *H04M 1/02* (2006.01)
  *H04N 7/18* (2006.01)
  *H04B 1/3883* (2015.01)

(52) U.S. Cl.
  CPC ....... *H04N 5/2256* (2013.01); *H04N 5/23229* (2013.01); *H04N 5/23241* (2013.01); *H04N 7/185* (2013.01)

(58) Field of Classification Search
  CPC .... G06F 1/3215; G06F 3/0362; G06F 1/1628; H04M 1/0202; H04M 1/0274; H04M 1/0264; H04M 1/72409; H04M 1/2755; H04M 1/04; H02J 7/0045; H02J 7/00; H02J 7/0044; H04N 7/185; H04N 5/23229; H04N 5/2256; H04N 5/23241; H04N 5/232; H04N 5/23222; H04N 5/23203; H04N 5/2257; H04B 1/3883; H04B 1/3833
  See application file for complete search history.

(56) References Cited

U.S. PATENT DOCUMENTS

| | | | |
|---|---|---|---|
| 5,013,898 A | 5/1991 | Blasspool | |
| 5,497,507 A | 3/1996 | Komaki | |
| 5,710,987 A | 1/1998 | Paulick | |
| 5,736,726 A | 4/1998 | Vanhorn | |
| 6,652,170 B1 | 11/2003 | Arnold | |
| 6,766,175 B2 | 7/2004 | Uchiyama | |
| 6,822,639 B1 | 11/2004 | Silverbrook | |
| 6,832,729 B1 * | 12/2004 | Perry | G06K 7/10881 235/462.45 |
| 7,366,541 B2 | 4/2008 | Goebel | |
| 7,454,170 B2 | 11/2008 | Wilhelmus | |
| 7,688,580 B2 | 3/2010 | Richardson | |
| 7,791,312 B2 | 9/2010 | Kook | |
| 7,948,208 B2 | 5/2011 | Partovi | |
| 8,169,185 B2 | 5/2012 | Partovi | |
| 8,346,979 B1 | 1/2013 | Lee | |
| RE44,122 E | 4/2013 | Kumar | |
| 8,428,644 B1 | 4/2013 | Harooni | |
| 8,483,758 B2 | 7/2013 | Huang | |
| 8,577,412 B1 | 11/2013 | Bishop | |
| 2002/0013161 A1 | 1/2002 | Schaeffer | |
| 2003/0003864 A1 | 1/2003 | Locke | |
| 2004/0070867 A1 | 4/2004 | Kudo | |
| 2006/0046793 A1 | 3/2006 | Hamilton | |
| 2007/0103110 A1 | 5/2007 | Sagoo | |
| 2007/0223182 A1 * | 9/2007 | Swan | G06F 1/3203 361/730 |
| 2007/0280677 A1 | 12/2007 | Drake | |
| 2008/0192410 A1 | 8/2008 | Kumar | |
| 2008/0258679 A1 | 10/2008 | Manico | |
| 2009/0066509 A1 | 3/2009 | Jernstrom | |
| 2009/0096413 A1 | 4/2009 | Partovi | |
| 2010/0088439 A1 | 4/2010 | Ang | |
| 2012/0032632 A1 | 2/2012 | Boar | |
| 2012/0101874 A1 | 4/2012 | Ben-Haim | |
| 2012/0257008 A1 | 10/2012 | Taylor | |
| 2012/0270600 A1 | 10/2012 | Zelson | |
| 2012/0282977 A1 | 11/2012 | Haleluk | |
| 2012/0320503 A1 | 12/2012 | Yturralde | |
| 2013/0109316 A1 | 5/2013 | Lee | |
| 2013/0135871 A1 | 5/2013 | Harooni | |
| 2013/0150122 A1 | 6/2013 | Kulas | |
| 2013/0260677 A1 | 10/2013 | Partovi | |
| 2013/0300204 A1 | 11/2013 | Partovi | |
| 2013/0314030 A1 * | 11/2013 | Fathollahi | H02J 7/0045 320/107 |
| 2013/0320340 A1 | 12/2013 | Acar | |
| 2014/0028243 A1 | 1/2014 | Rayner | |
| 2014/0099526 A1 | 4/2014 | Powell | |
| 2014/0152890 A1 | 6/2014 | Rayner | |
| 2014/0191033 A1 | 7/2014 | Wojcik | |
| 2014/0191568 A1 | 7/2014 | Partovi | |
| 2014/0209691 A1 * | 7/2014 | Finn | G06K 19/07794 235/492 |
| 2014/0233180 A1 * | 8/2014 | Vargas | G06F 1/1613 361/679.55 |
| 2014/0265762 A1 | 9/2014 | Murphy | |
| 2014/0291404 A1 | 10/2014 | Matsuoka | |
| 2015/0028104 A1 | 1/2015 | Ma | |
| 2015/0178538 A1 | 6/2015 | Gerst, III | |
| 2015/0178539 A1 | 6/2015 | Gerst, III | |
| 2018/0059758 A1 * | 3/2018 | Boatner | G06K 7/1417 |

FOREIGN PATENT DOCUMENTS

| | | |
|---|---|---|
| WO | 2004017613 A1 | 2/2004 |
| WO | 2011011649 A1 | 1/2011 |
| WO | 2012114142 A1 | 8/2012 |

* cited by examiner

IMAGE MODULE INCLUDING MOUNTING AND DECODER FOR MOBILE DEVICES

RELATED APPLICATIONS

This application is a continuation in part of co-pending U.S. patent application Ser. No. 14/137,975, entitled IMAGE MODULE INCLUDING MOUNTING AND DECODER FOR MOBILE DEVICES, filed Dec. 20, 2013, and co-pending U.S. patent application Ser. No. 14/550,709, entitled IMAGE MODULE INCLUDING MOUNTING AND DECODER FOR MOBILE DEVICES, filed Nov. 21, 2014, the entire disclosure of each of which applications is herein incorporated by reference.

FIELD OF THE INVENTION

This invention relates to machine vision systems and computer-readable applications operable on a mobile device with an imaging module, such as a digital music player or cellular telephone.

BACKGROUND OF THE INVENTION

Vision systems that perform measurement, inspection, alignment of objects and/or decoding of symbology (e.g. one-dimensional and two-dimensional bar codes—also termed "ID codes") are used in a wide range of applications and industries. These systems are based around the use of an image sensor (also termed an "imager"), which acquires images (typically grayscale or color, and in one, two or three dimensions) of the subject or object, and processes these acquired images using an on-board or interconnected vision system processor. The processor generally includes both processing hardware and non-transitory computer-readable program instructions that perform one or more vision system processes to generate a desired output based upon the image's processed information. This image information is typically provided within an array of image pixels each having various colors and/or intensities. In the example of an ID reader (also termed herein, a "camera"), the user or automated process acquires an image of an object that is believed to contain one or more barcodes, 2D codes (e.g. DataMatrix, QR, DotCode, etc.), or other symbol types applied by printing, Direct Part Marking (DPM), or other application techniques. The image is processed to identify code features, which are then decoded by a decoding process and/or processor obtain the inherent alphanumeric (or other) information represented by the code.

A common use for ID readers is in logistics and inventory/equipment tracking operations. These operations can entail use of handheld scanning devices by personnel who travel the floor of a worksite and apply the scanner to ID-containing surfaces of located on an object-of-interest. The data gathered by the handheld scanner is often transmitted contemporaneously, or subsequently, to a data processor (e.g. a server or a PC), using wired or wireless communication link, which includes appropriate data storage and handling applications.

The wide availability of so-called smartphones (i.e. cellular telephones that contain interactive touchscreens, cameras, microphones, Wi-Fi and Bluetooth® transceivers and robust processing capability) has transformed many aspects of personal and business activity. Such smartphones are currently available for a variety of commercial vendors, including, but not limited to, the Motorola Droid®, Apple iPhone®, and Samsung Galaxy® models. The small size and robust functionality of such handheld devices (and similar media players, such as the Apple iPod®) renders them highly useful in a variety of applications involving imaging, data handling and data communication. Various commercially available applications are available these devices, including ID readers. These applications allow a user to acquire and manipulate information contained in a wide range of printed ID types. However, devices are currently limited by their (typically slower) processing speed and more-limited imaging capabilities. Moreover, industrial ID readers typically include optics and illumination that is specifically adapted to read IDs on various surfaces, such as IDs that are directly marked onto parts (Direct Part Marking or DPM); while smartphones generally lack such specialized hardware. Thus, in an industrial/commercial setting, such devices are typically unable to handle the needs of the user. Likewise, many mobile devices are not designed, ergonomically for scanning as a primary mission, which can lead to errors and user fatigue over an extended period. Additionally, devices of different manufacturers have different form factors and button placement, which can vary from model-to-model and even between new versions of the same device. This makes it challenging to standardize a device (or its use) with a given scanning application for a plurality of users.

In certain applications, a device may be used in an environment in which wireless communication is challenging due to interference, range, jamming, and the like. Wired connections can be disadvantageous in that they become dirty or broken in an outdoor or industrial environment.

In addition to differences in form factor between handheld (e.g. smartphone) devices a further challenge stems from the fact that the physical data interconnection of the handheld device with a scanning base assembly can be inconvenient to implement. A connector or plug from the scanning base must be seated in the handheld device. This can limit the size and shape of the scanning base, as it should accommodate a plug and/or cord and allow for the handheld device to be attached with the plug or wire in place. Also, environmental contamination (dirt, dust, water, steam, etc., which are often present in industrial environments) can degrade the connection, and/or block data transmission.

SUMMARY OF THE INVENTION

This invention overcomes disadvantages of the prior art by providing a module into which a handheld device, such as a smartphone or media player with image handling and communications capability, is mounted. The module is water/weather-resistant or water/weatherproof and includes interconnections/link(s) to the device for power and data. The module includes an imager with optics and image acquisition/processing processors that provide high speed acquisition and handling of acquired image data—such as IDs. The acquired image data is transmitted through the link(s) to the device, where it is processed by the device processor using an instantiation of an appropriate module process application that resides within the device. The module includes various user interface elements, such as indicator lights and/or alarms that can indicate (for example) successful or unsuccessful reading of an ID. The module can include a subframe that removably mounts within the module's main body/frame (also termed a "base portion") and carries the device. The inner perimeter of the subframe is variable in geometry to accommodate different models and/or makes of devices, while the external perimeter and other surface features are standardized to mount within a single (universal), main body/frame geometry. The main body/frame includes appropriate ports, windows and/or cutouts to enable optical transmission to, for example, cameras and illuminators so that various native functions of the device can be employed as desired. The main body/frame can also house a battery and charging assembly that supplies power to the device and allows charging through-for example and inductive charging unit. Appropriate transfer coils are mounted within each of the main body/frame and the external charger, respectively, to allow for the transmission of electromagnetic (EM) energy therebetween.

In an illustrative embodiment, a handheld vision system module comprises a main body constructed and arranged to be gripped by a hand of a user. A subframe that removably attaches to a receiving area formed on a surface of the module. The subframe includes an inner edge adapted to receive and retain a handheld mobile device having a first device form factor. Illustratively, processor/processor circuitry is located within the main body and a battery is operatively connected with the processor circuitry, and is also located within the main body. The processor circuitry is arranged to generate processed image data (e.g. decoded ID image data). An imager (assembly) is also located on the main body, and is operatively connected with the processor circuitry. The imager assembly provides image data to the processor circuitry from which processed image data is generated. The imager assembly includes an image sensor and optics arranged to acquire images of a scene. A module application running on the mobile device (and its associated device operating system) allows receipt of, and manipulation of, the processed image data provided by the circuitry, and acquired from the imager. In particular, the image data can be preprocessed in the imager assembly to generate decoded (or other) relevant information, or undecoded image data can be passed from the circuitry to, for example, the module application for decoding. Illustratively, the battery is rechargeable and the system can include a charging circuit that recharges the battery from an external power source. The charging circuit can be operatively connected to an induction coil mounted on the main body, and the external charger can include a corresponding induction coil that selectively transmits energy to the induction coil mounted on the main body. Alternatively, or additionally, connector (such as a plug and socket and/or contact pad arrangement) can be mounted on the main body. The external charger can thus include a connector that removably docks with the connector on the main body to transmit power therebetween. The imager assembly can also include an integral, onboard imager processor having an ID decoding process. Illustratively, a connector, operatively connected with the processor circuitry, attaches to a connection on the device for receiving power and data. This connector can define a variety of commercially available form factors, such as an Apple standard (e.g. Lightning™) or USB-type connector. In general, the term "Apple form factor" in the context of the connector shall refer to any power/data connector provided for use with appropriately sized Apple products that can be housed by the module in accordance with an embodiment herein. Illustratively, the connector is attached to a cable residing the receiving area, and the receiving area defines a recess with an inner perimeter. In various embodiments, an outer perimeter of the subframe engages the inner perimeter of the recess with a friction fit, and thereby seals the joint between the subframe and main body. The exemplary device can include a touch screen facing the user, and is covered with a sheet of transparent material that provides a sealing layer against moisture. The effect a seal, the sheet can engage an edge of the subframe. The subframe can include a resilient surface that facilitates both the seal and the above-described friction fit. A switch button can be located on the main body and is operatively connected to the processor circuitry This switch button is constructed and arranged to operate at least one of the imager and the mobile device—for example, triggering acquisition of an image, wherein image information (e.g. decoded data from an ID in the image) is transmitted to the mobile device over the cable link. In various embodiments, one or more indicators (e.g. LED lights, LCD screens, etc.) are located on the main body and are operatively connected to the processor circuitry constructed and arranged to report a status of at least one of the imager and the mobile device. This status can include at least one of a successful decoding of an ID in the imaged scene and unsuccessful decoding of the ID in the imaged scene. The exemplary scene can include at least one ID, in which the processor circuitry and/or the mobile device module application is constructed and arranged to decode the ID and generate information related thereto. The system can support another, differing subframe. This additional subframe can include an inner edge adapted to receive and retain a handheld mobile device having a second device form factor, and another module application running on that mobile device. The module application can be arranged to transmit information related to the image data over a wireless link using a transceiver located in the mobile device. The information can comprise decoded ID information. Illustratively, the imager is mounted in an imager module that includes an integral optics and illumination assembly. This illumination assembly can include at least one of a scene illuminator and an aimer assembly. The imager and illumination assembly are mounted in a module shell, in which the shell is constructed and arranged to rotate about at least one axis with respect to the main body. The subframe (and/or optionally, the circuitry in the main frame/body) contains at least one of an authentication processor and interface conversion circuitry interconnecting the mobile device and the processor circuitry. The mobile device typically includes a native camera assembly on a side thereof opposite a side facing the user. The main body thus includes a slot constructed and arranged to provide an optical path for the native camera assembly.

In a further illustrative embodiment the image module comprises a handheld vision system module comprises a body constructed and arranged to be gripped by a hand of a user. A retaining component removably attaches to a base portion of the module, adapted to receive and retain a handheld mobile device having a first device form factor. Processor circuitry is located within the base portion. The processor arranged to generate processed image data. A battery is operatively connected with the processor circuitry and is located within the base portion. An imager is located relative to the base portion, and is operatively connected with the processor circuitry. The imager is arranged to acquire images of a scene and transmit image data to the processor circuitry. A module application, running on the mobile device, allows receipt of, and manipulation of, the processed image data. Illustratively, the processor circuitry includes an imager processor having an ID decoding process, the imager processor being located in a pod with an image sensor and optics. A receiving surface for the mobile device is provided on the base portion. The receiving surface defines either a recess with an inner perimeter or a formed gasket with a lip that surrounds at least a portion of the device. The retaining component comprises either, (a) a top cover that overlies and seals compressibly against the gasket and includes a window exposing a touch screen of the device, or (b) a subframe that surrounds the device and seats within a recess in the base portion. The top cover includes at least one of an on-off button that engages an on/off button on the device through a hinging action and an overlying home button that engages a home button on the device, each of the on/off button and the overlying home button is sealed by elastomeric sealing elements against moisture reaching the device.

Illustratively, the processor circuitry of the image module includes an imager processor having an ID-decoding process, the imager processor being located in combination with an image sensor and optics in a pod within the base portion. A connector, operatively connected with the processor circuitry, attaches to a connection on the device for receiving power and data. The connector defines either an Apple or USB form factor and can be attached to a cable that interconnects with a port on a receiving surface of the base portion. The receiving surface can define either a recess with an inner perimeter or a formed gasket with a lip that surrounds at least a portion of the device. Illustratively, the retaining component comprises either, (a) a top cover that overlies and seals compressibly against the gasket and includes a window exposing a touch screen of the device, or (b) a subframe that surrounds the device and seats within a recess in the base portion. The retaining component comprises a soft polymer element with sealing and shock-absorbing properties. At least one function button can be located on the base portion and operatively connected to the processor circuitry, which is constructed and arranged to operate at least one of the imager and the mobile device. The function button can be arranged to trigger acquisition of an image of the scene by the imager. An optical indicator can be mounted on the base portion and can be operatively connected to the processor circuitry. The imaged scene can include at least one ID, and at least one of the processor circuitry and the mobile device module application can be constructed and arranged to decode the ID and generate information related thereto. The indicator can be constructed and arranged to report a status of at least one of the imager and the mobile device; and such status defines at least one of a successful decoding of an ID in the imaged scene and unsuccessful decoding of the ID in the imaged scene. To provide for use of the module with a variety of handheld device makes/models, another retaining component can be adapted to receive and retain (a) a handheld mobile device having a second device form factor, and (b) another module application running on the mobile device having the second device form factor that allows receipt of, and manipulation of, image data provided by the circuitry acquired from the imager. The other retaining component can comprise either (a) another top cover and gasket or (b) another subframe. The module application can be arranged to transmit information related to the image data over a wireless link using a transceiver located in the mobile device. Illustratively, the imager is mounted in an imager pod that includes at least an integral optics, and illumination assembly. The illumination assembly can have at least one of a scene illuminator and an aimer assembly. The imager pod provides the sensor surrounded by a light pipe in optical communication with an illumination board. The imager pod can be constructed and arranged to rotate about at least one axis with respect to the main body, and the light pipe can have light-conditioning surfaces thereon and a central viewing window for lens optics and the aimer.

Illustratively, the mobile device mounted within the handheld vision system can have a native camera assembly on a side thereof opposite a side facing the user, and the base portion can have a slot constructed and arranged to provide an optical path for the native camera assembly. At least one of, (a) an authentication processor and (b) interface conversion circuitry interconnecting the mobile device, and the processor circuitry can be located in at least one of the base portion, the retaining components and a connector between the mobile device and the base portion. An optional grip handle assembly with a trigger switch is removably attached and operatively connected to the base portion. The grip portion can house a battery located therein operatively connected with at least one of the base portion and the mobile device. Optionally, the base portion has a battery hatch cover that is constructed and arranged to be exchanged with an accessory battery hatch cover to hold or mount the device.

In an exemplary embodiment, a handheld vision system module provides a base assembly adapted to charge a mounted mobile device (e.g. smartphone) via a physical connector (Apple Lightning®, micro USB, etc.) and/or wireless charging arrangement. Data communication between the base and mobile device can occur using an RF link, such an integrated Bluetooth® functionality. This increases convenience for the user in attaching the device to the base assembly, and makes for a more reliable and robust data link between the mobile device and scanning base assembly.

In an illustrative embodiment, a handheld vision system module and method for use of the same is provided, including a scanning base assembly adapted to receive and retain a handheld mobile device and processor circuitry, located within the base assembly. The processor circuitry is arranged to generate processed image data. A battery, operatively connected with the processor circuitry, is located within the base assembly. An imager is located relative to the base assembly, and is operatively connected with the processor circuitry. The imager is arranged to acquire images of a scene and transmit image data to the processor circuitry. An application, running on the mobile device, allows receipt of, and manipulation of, the image data. An RF communication circuit and antenna are operatively connected with the processor circuitry on the base assembly, and are adapted to transmit the image data to an RF communication circuit having an antenna on the mobile device. Illustratively, the RF communication circuit employs at least one of a communication protocol, based upon at least one of WiFi, 802.11 and Bluetooth®. A charging circuit can be operatively connected with the battery on the base assembly, and is constructed and arranged to charge a battery of the mobile device. The charging circuit can be connected to at least one of a charging connector and a wireless charging pad. Illustratively, the charging connector is a micro USB connector or it can define an Apple-based form factor, which can be controlled in accordance with a Qi standard, using the processor circuitry. In an exemplary embodiment, the connector is mounted in a fixed relation to the base assembly or is mounted on a wire attached to the base assembly. The RF communication circuit can be adapted to receive settings and configuration for the base assembly from the mobile device. The battery in the base assembly is rechargeable and further comprises a charging circuit in a cradle that recharges the battery from an external power source. The charging circuit is operatively connected to at least one of (a) an induction coil mounted on the base assembly, wherein the external charger has an induction coil that selectively transmits energy to the induction coil mounted on the main body and (b) a connector mounted on the base assembly, in which the external charger has a connector that removably docks with the connector on the base assembly to transmit power therebetween. The processor circuitry has an image processor with an ID-decoding process, in which the imager processor is located in combination with an image sensor and optics in an imager pod within the base assembly. The imager pod that can have, at least, an integral optics and an illumination assembly, in which the illumination assembly includes at least one of a scene illuminator and an aimer assembly. The base assembly defines either (a) a recess with an inner perimeter or (b) a formed gasket with a lip that surrounds at least a portion of the mobile device, in which a touchscreen of the mobile device is exposed for a user to operate. The base assembly can also include an indicator that shows as status of a communication link between the RF communication circuit on the base assembly and the RF communication circuit on the mobile device. The system and method can further comprise at least one of an image-acquisition trigger and a function button located on the base assembly, which are operatively connected to the processor circuitry, and are constructed and arranged to operate at least one of the imager and the mobile device. The base assembly can have a status indicator that shows at least one of (a) a successful decoding of an ID in the imaged scene and (a) unsuccessful decoding of the ID in the imaged scene. Illustratively, the imaged scene has at least one ID code, and at least one of the processor circuitry and the mobile device module application is constructed and arranged to decode the ID code and generate information related thereto that is transmitted by the RF communication circuitry and the antenna for the base assembly. The application can be arranged to transmit information related to the image data over a wireless link using a transceiver located in the mobile device to a remote network. The network can interconnect to one or more external data handling devices that are adapted to receive and manipulate vision system information from the module. Illustratively a grip handle assembly is provided to the base assembly, with a trigger switch removably attached and operatively connected to the base assembly.

In a further exemplary embodiment, a handheld vision system module includes a main body having a main body inner edge that defines, at least in part, a main body top recess and processor circuitry located within the main body. The processor circuitry is arranged to generate processed image data. A battery is operatively connected with the processor circuitry, located within the main body. An imager module is located on the main body and operatively connected with the processor circuitry. It is arranged to acquire images of a scene and transmit image data to the processor circuitry. The imager module includes a shell allowing for rotation of an optical axis of the imager module with respect to a longitudinal axis of the main body. The shell can define a semi-cylindrical or other acceptable shape. A handheld mobile device has a first device form factor removably attached with respect to the main body and receiving power from the battery. An RF communication circuit and antenna are operatively connected with the processor circuitry on the main body that is adapted to transmit the processed image data to an RF communication circuit having an antenna on the handheld mobile device.

The vision system can further include a subframe, having a subframe outer perimeter and a subframe inner perimeter. The perimeters together define, at least in part, a subframe top recess. The subframe is removably receivable within the main body inner edge and main body top recess. The subframe is adapted to receive and retain the handheld mobile device within the subframe top recess. The RF communication circuit can employ at least one of a communication protocol based upon at least one of WiFi, 802.11 and Bluetooth®. A charging circuit is operatively connected with the battery on the main body It is constructed and arranged to charge a battery of the handheld mobile device, and can be connected to at least one of a charging connector and a wireless charging pad. The system can also include various elements and features described further above.

BRIEF DESCRIPTION OF THE DRAWINGS

The invention description below refers to the accompanying drawings, of which.

DETAILED DESCRIPTION

I. Module with Subframe

Figure 1:
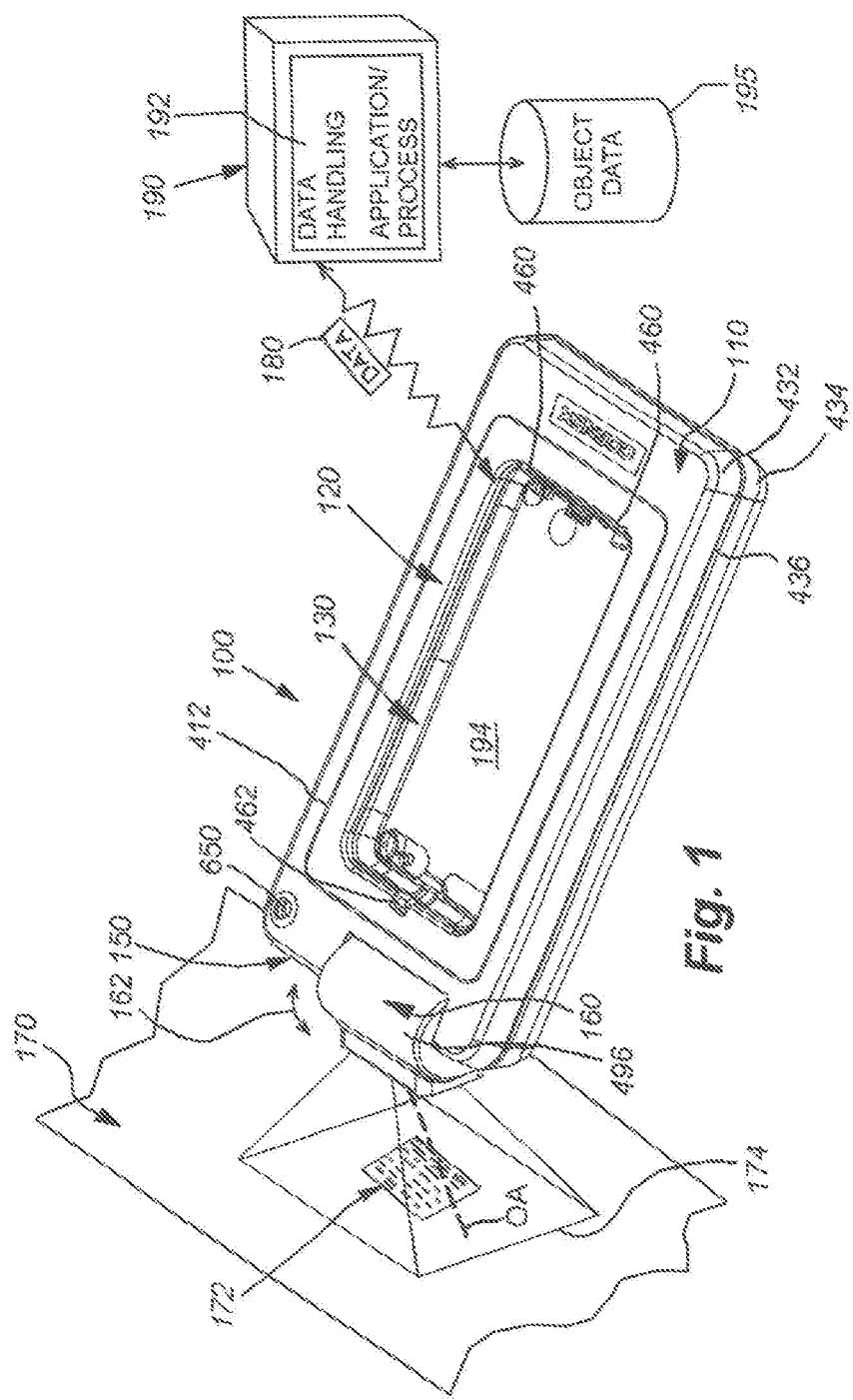
FIG. 1 is a perspective view of an illustrative embodiment of a water/weatherproof image module with a handheld device (e.g. an Apple iPhone®) mounted therein acquiring an image of a code on an exemplary object, and transmitting decoded data to a data handling application on a processing device (e.g. a server or PC) in which a subframe is employed to maintain the device with respect to the module.
Figure 2:
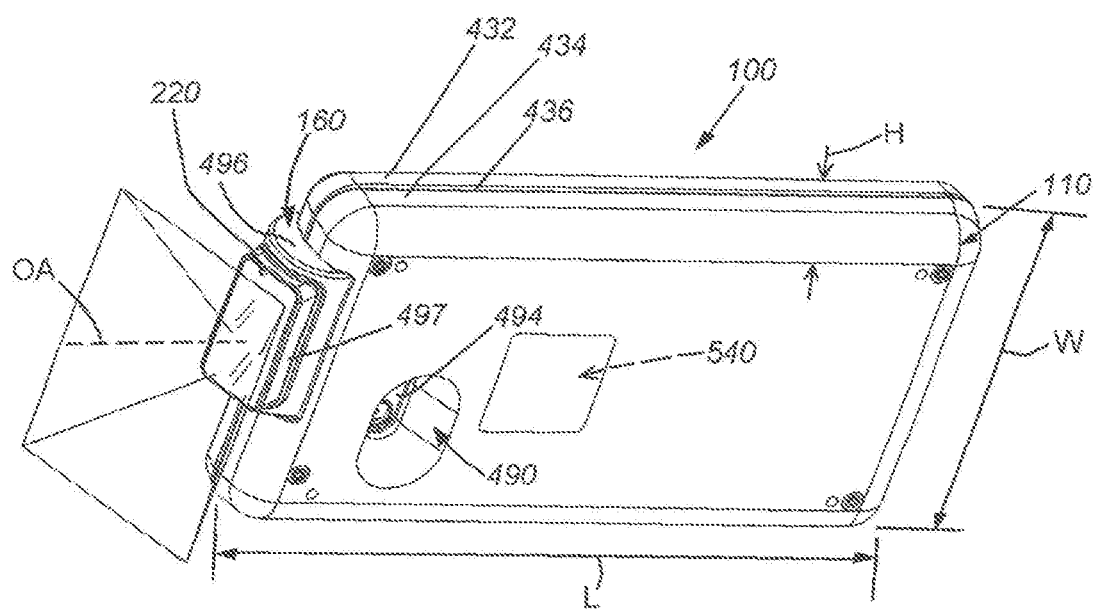
FIG. 2 is a bottom perspective view of the image module and handheld device of FIG. 1.

FIG. 1 depicts an image module assembly 100 that is constructed from a variety of durable materials, typically a polymer or composite (described further below). The module assembly is illustratively waterproof and/or weatherproof—resisting incursion of liquids due to casual contact and/or partial or full immersion. The module consists of three primary assemblies, the main frame or body 110, a subframe 120 that removably resides within the main frame 110, and a commercially available handheld, mobile device 130 (also summarily termed a "device"), such as a smartphone or media player available from a variety of sources, including, but not limited to, the Motorola Droid®, Apple iPhone®, and Samsung Galaxy® model telephones and/or iPod media player. The depicted device 130 is, by way of non-limiting example, a so-called iPod® Touch, 5$^{th}$ generation media player, available from Apple, Inc. of Cupertino, Calif. Alternatively, the iPhone® 5 can be employed in the depicted embodiment some modifications (e.g. to the subframe 120) to account for differences in device thickness. The subframe 120 is arranged with an inner perimeter that removably receives and retains the outer perimeter of the device 130, and defines a particular geometry that closely conforms to this device shape. As described further below, the subframe notably allows for a single main frame/body (110) shape while a variety of subframe geometries, each adapted to a given device form factor, can be provided. All subframes mount within the main frame/body 110 in a similar manner. That is, the outer shape of each subframe is similar or identical, and/or more generally is standardized to mount within the mounting location of a common main frame/body 110. In this manner, different devices can be accommodated by the same main frame/body by employing the appropriate device-specific subframe.

As shown, the front end 150 of the main frame/body 110 includes an imager module 160, which is pivotally mounted (double-curved arrow 162) on the front end 150. This allows the user to adjust the relative angle of attack of the module's optical axis OA with respect to an object surface. As shown, an exemplary object surface 170, containing an associated ID 172 (e.g. a DPM applied code) is imaged by the module 160, with the ID residing within the module's field of view (FOV) 174. In this embodiment, the FOV 174 is rectangular, but can circumscribe other shapes in alternate embodiments.

The device 130 includes various, well-known communication and/or networking wireless transceivers, including, but not limited to, Wi-Fi, Bluetooth®, cellular protocols (e.g. CDMA), etc. These transceivers (e.g. the Wi-Fi transceiver) transmit and received data 180 to a remote data handling device such as a server or PC 190 containing an appropriate processor and data handling process 192 (for example, an inventory tracking application). Data can be stored in an appropriate storage device 195 (e.g. a disk, SAN, etc.).

With further reference to FIGS. 2-5, the structure and associated function of the module main frame/body 110 and subframe 120 is now described in further detail. The main frame/body 110 contains the electronics, imager assembly and battery power used to operate the overall unit. The dimensions of the main frame/body 110 are highly variable, but typically are arranged to fit a typical user's hand for single-handed grip and manipulation. In an embodiment, the outer dimensions of the main frame/body 110 define a length L (see FIG. 2) of approximately 670 millimeters, a width W of approximately 100 millimeters and a height H of approximately 25 millimeters. These dimensions are sufficient to house functional components and to completely receive the mobile device (device) 130 in a manner described further below. These dimensions are highly available in alternate embodiments and can be reduced as appropriate to fit particular users' hands. In an embodiment, the main frame/body 110 is constructed (e.g. molded) from a suitable polymer, such as ABS, PET, acrylic, polycarbonate, or from another appropriate material.

Figure 4:
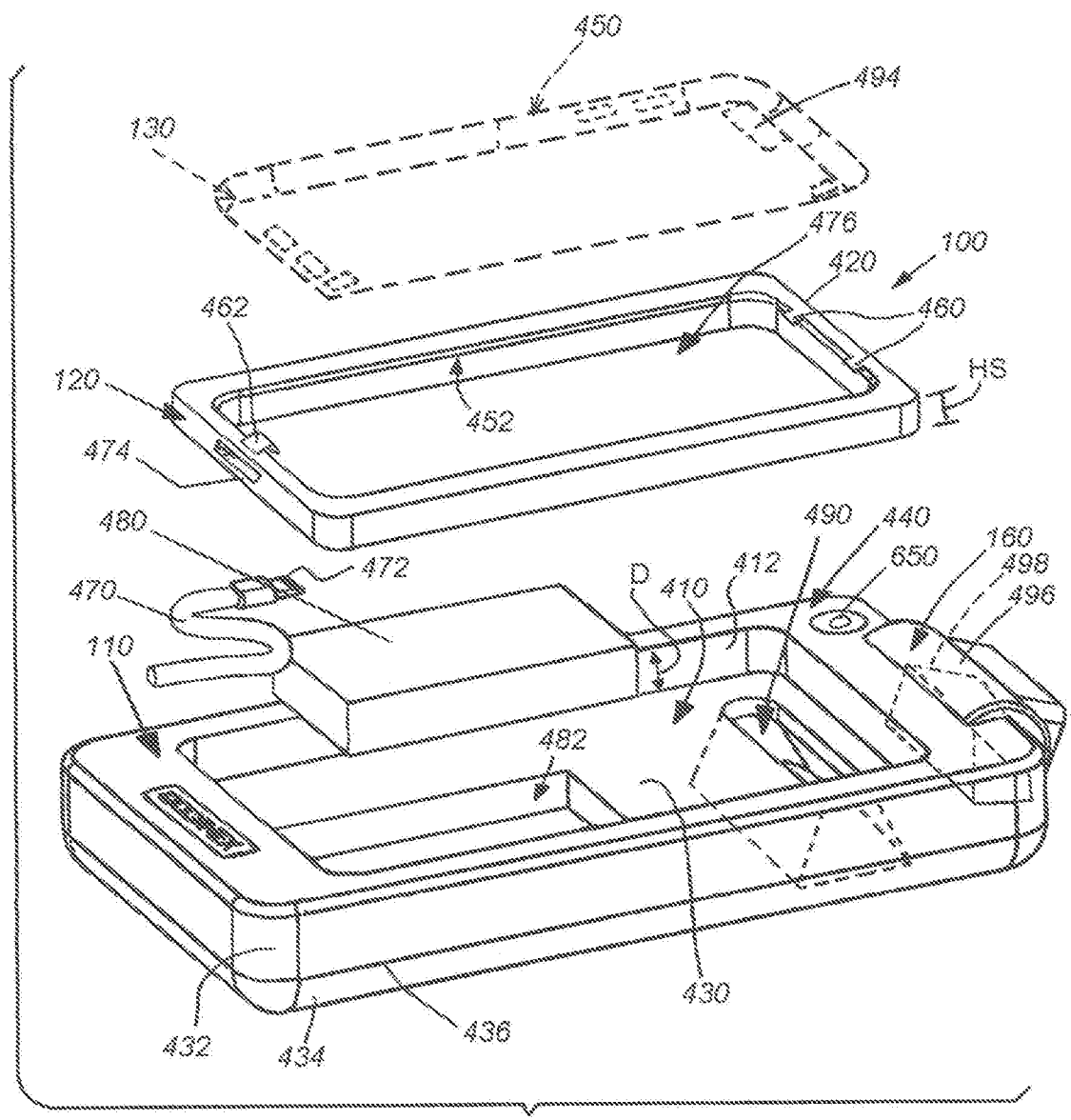
FIG. 4 is an exploded perspective view of the image module, showing the main frame/body, subframe, handheld device, interconnect cable(link) and battery.
Figure 5:
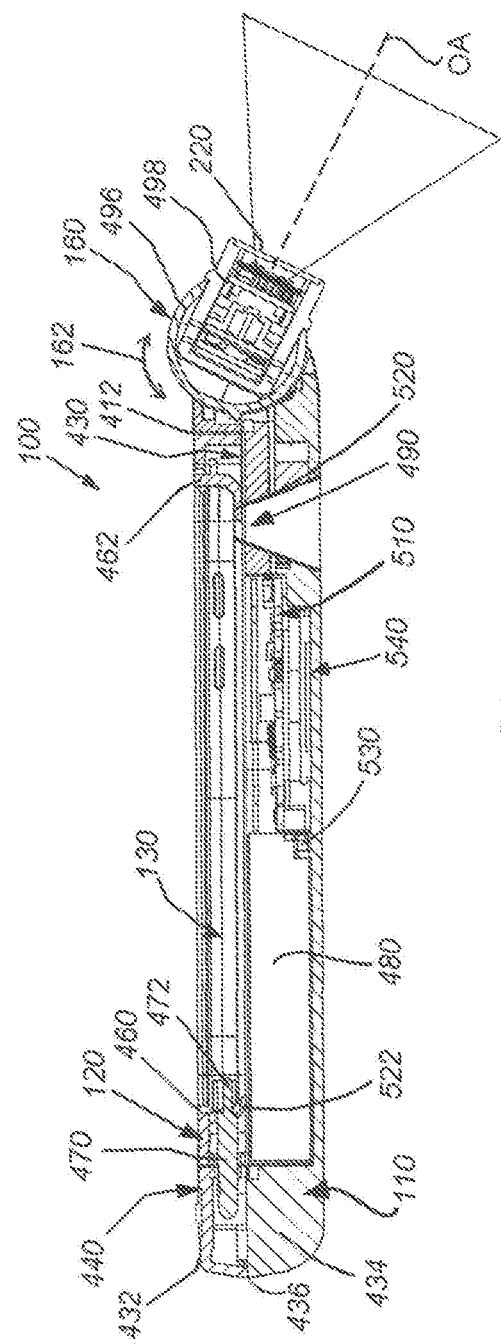
FIG. 5 is a side cross section of the image module and handheld device of taken along line 5-5 of FIG. 3.

As shown in FIG. 4, the main body/frame (also termed a "base portion" or "base assembly") 110 includes a top recess 410, defined by a perimeter edge 412, which is arranged to removably receive the subframe 120. The recess includes a floor 430 that can be molded with the frame/body 110 or can be separately applied. Illustratively, the main frame/body 110 is formed from a separate top section 432 and bottom section 434, joined at a seam line 436—with the floor 430 molded as part of the top section 432. The floor 430 covers various electronic components housed within the bottom section 432, such as the main circuit board 510 (FIG. 5). The functionality of this circuit board 510 is described further below. In general, it controls power and image data handling between the module 110 and the device 130. The floor 430 resides at a depth D with respect to the top face 440 of the main body/frame 110. The subframe can be constructed from an appropriate material, such as a resilient polymer (e.g. Poron) in which the subframe flexes to grip the device, or a rigid plastic—e.g. PET, ABS, polycarbonate, etc.). It defines an outer perimeter 420 and height HS that conform to the inner perimeter 412 and depth D of the recess 410. In this manner, the subframe 120 seats within the recess with minimal projection or gapping.

The subframe is shaped to removably secure the device 130 by conforming to the device's outer perimeter/edge 450 with a corresponding subframe inner perimeter 452. The inner perimeter 452 can illustratively include a curvilinear profile so as to closely conform to the form factor of the device outer perimeter/edge 450. The inner perimeter 452 can include one or more locking tabs 460 and 462. Tabs 460 on at least one side can be fixed in place and at least one opposing tab 462 can be molded with a unitary live spring or another mechanism that allows it to be springably moved between a (normal) retaining and (biased) releasing orientation. In this manner the device 130 can be selectively secured into or removed from the subframe 120, respectively. The lower edge of the subframe 120 can include a lip 520, 522 (FIG. 5) or other inward projection that retains the bottom side of the device so that only release of the spring-loaded locking tab 462 allows withdrawal and removal of the device 130 from the subframe 120.

As shown in FIG. 4, the main frame/body 110 includes a cable 470 and associated plug 472 that removably interconnects data and power between the module circuit board 510 to the device 130. A variety of alternate connection modalities can be implemented in alternate embodiments. For example, a fixed connector can be mounted in the subframe 120 (to which the device 130 connects when mounted therein). This fixed connector removably and electrically engages contact pads on the main frame/housing recess 410 and/or floor 430. In the illustrative embodiment, the subframe 120 includes an appropriately dimensioned cutout or through-slot 474 through which the connector plug 472 passes and engages the socket at the base of the device 130. The exemplary device supports a connector plug 472 having the Apple Lightning™ form factor. Other connectors (e.g. the popular micro USB) can be provided to the cable to interconnect other exemplary devices with appropriate (well-known) communication protocols and authentication circuitry as described further below.

Note some handheld device types can necessitate more than one connector and/or connecting cable and associated cutout and/or slot in the subframe to enable both power and date connectivity between the device and the module.

The subframe 120 is removably secured in the main frame/body 110 using a variety of mechanisms and/or techniques. In an embodiment, the subframe 120 is secured to the main body/frame 110 by a friction-fit, with its outer perimeter 420 defining a resilient surface that compresses slightly when pressed into the outer perimeter 412 of the recess 410. This can provide a generally weather-tight seal between the two components. Alternatively, or additionally, the subframe can be removably secured to the main body/frame using a variety of locking structures, such as catches, detents and projections threaded fasteners, snaps, and the like. In addition, the top side of the subframe 120 can include a transparent cover formed from a conventional material, such as plastic sheeting (not shown), which provides a further seal to resist incursion of moisture into the device. The sheet can be located external to the device or, illustratively, on the surface of the device touch screen 194 in a manner similar to a conventional mobile device case system, such as those commercially available from Life-Proof of San Diego, Calif. The top rim of the subframe 120 in such arrangements is adapted to seal against an engaging part of the sheet, forming a complete seal with respect to the device. The sheet allows the touchscreen 194 to be operated in a normal manner by the user. In general, the overall construction of the outer surface of the main body/frame 110 is sealed so as to resist intrusion of moisture. More notably, the dimensions of the top opening 476 of the subframe 120 are adapted to allow substantially complete access to the functional area of the device touchscreen 194. As described further below, this allows all significant functions of the device to be employed, including various interactive applications (e.g. image-handling, communications, GPS location, media play, etc.), whilst also supporting the enhanced scanning and vision system functions facilitated by the imager 160 and associated circuitry 510 of the main body/frame 110.

The circuitry 510 also supports power supply (battery) and associated charging operations for both the imager module's functional components. A rechargeable battery 480 of either a conventional or customized form factor resides in a well 482 in the floor 430 of the bottom section 434 of the main body/frame 110. The battery 480 can be based upon a variety of technologies including, but not limited to, Lithium Ion/Lithium polymer, Nickel Metal Hydride or Nickel Cadmium. It removably and electrically interconnects with contact pads 530 (FIG. 5) that are operatively connected to the circuit board 510. The battery 480 powers both the imager assembly 160 and any associated components on the main body/frame 110 (such as an alarm and read status indicator—described further below), and also interconnects power to the device 130 via the cable 470. In this manner, the (typically) smaller-capacity battery in the device 130 can be continually boosted and recharged via the (typically) larger-capacity module battery 480. The module battery 480 is, itself, charged via a charging system that is incorporated into the circuitry 510, and can employ components known to those of skill in the art. Illustratively, the charging system is wireless, and includes an induction coil assembly 540 that resides adjacent to the bottom face of the main body/frame. During a charging cycle, this coil assembly 540 removably interfaces with a charger having a corresponding induction coil. The charger is powered, typically, by 120 or 220 VAC line current, and includes circuitry that typically drives the charger induction coil at a desired lower voltage. An appropriate charging pad and/or cradle (not shown) can support the module during charging cycles. The induction coil in the charger transmits EM energy to the coil 540 in the module 100, which is converted into charging current to energize the battery 480. Alternately, the module can include a jack, defining a plug, socket and/or charging pads, which are exposed, or selectively concealed behind a (e.g. weatherproof) door or hatch. The module-mounted charging jack can define any acceptable form factor and can also include data connections to transfer application and/or acquired data to and from the module. Alternatively, data can be transferred via the device and/or via one or more transceiver(s) operatively connected to the module circuitry 510. Each of these communication arrangements can be conventional, and in accordance with skill in the art.

The main body/frame 110 enables the device's native camera and illumination functions to be employed via a frustoconical slot arrangement 490 in which the slot tapers outwardly toward the exterior of the module. The opening of the slot is placed into the floor and overlies the location on the device's back side on which its onboard camera and illuminator 494 are positioned. In this manner, the device's standard camera functionality remains available to the user via touch screen (194) control.

The imager module 160 is provided at a relatively centered location on the front edge of the main body/frame 110 of the module 100. The imager module 160 includes a semi-cylindrical outer shell 496 and a rectangular projection 497 with a front window 220 (FIG. 2) that protects the imager assembly 498 from moisture and debris. The imager assembly notably includes an image sensor, optics, illumination, aiming, an image processor and a decoding processor all within a single circuit package that is encapsulated in the rotatable shell as shown. The circuit board is provided as a flexible technology component with a serpentine shape to enable compaction.

The imager assembly 498 includes on-board optics (e.g. an M-12 lens), a camera and an image processor that includes (illustratively) a built-in ID decoder. In alternate embodiments, decoding can occur in whole or in part within another portion of the module and/or the device. A variety of image configurations and associated functions can be employed in alternate embodiments. The cylindrical shape of the outer shell 496 allows it to swivel or rotate (double arrow 162) to change the relative angle of the optical axis OA with respect to the longitudinal axis (along the length (L) direction of the module). This feature allows the user to more precisely point the imager at the expected location of IDs while maintaining the module 100 with a chosen grip and positioning relative to scanned objects. The shell 496 includes contacts or connections that enable rotation while maintaining power and data interconnection with the circuit board 510.

Figure 6:
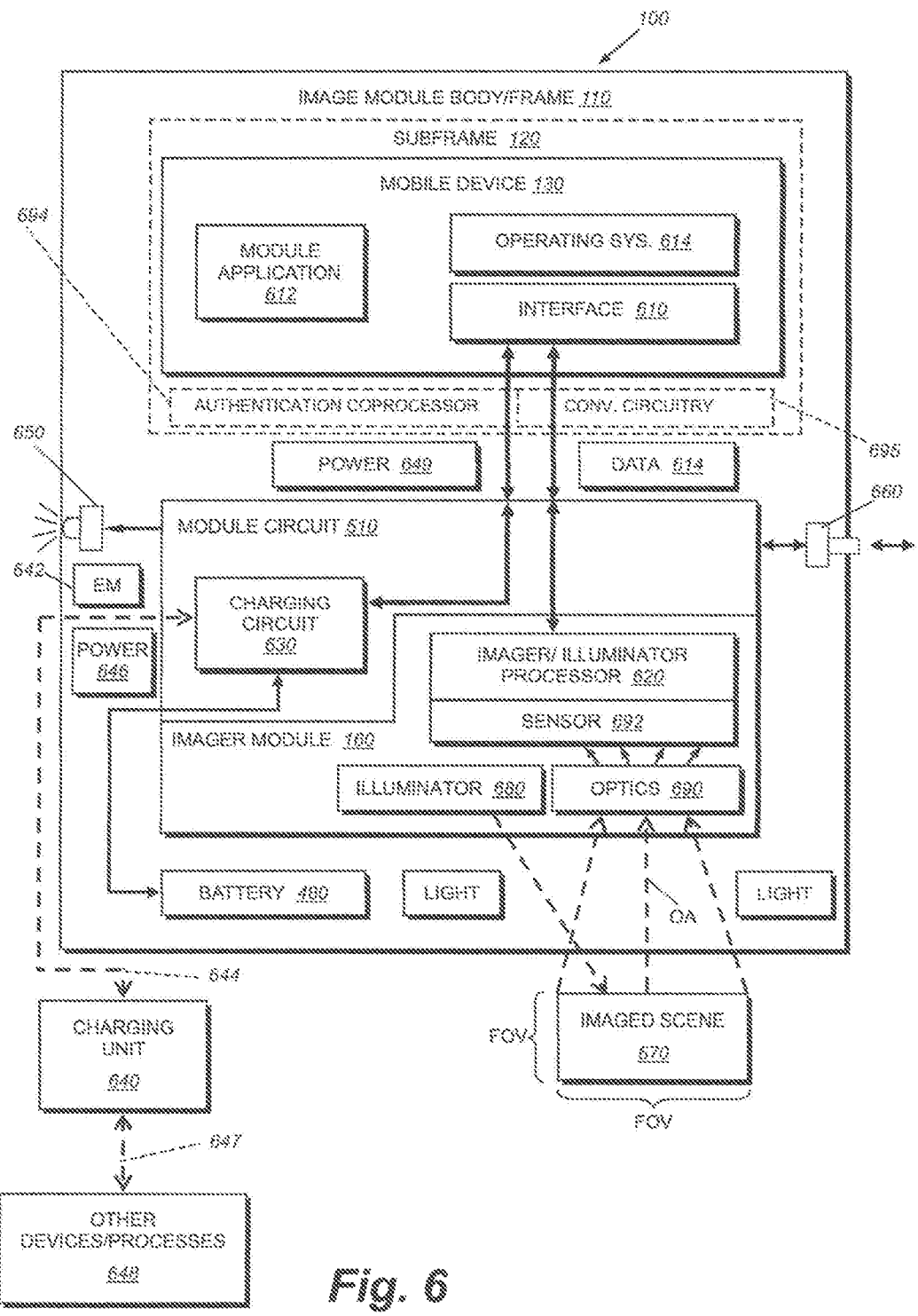
FIG. 6 is a block diagram showing the functional components, processes and processor of the image module and the handheld device of FIG. 1.

Notably, the use of a separate imager assembly 496 enables high-speed acquisition and transfer of image data to the device 130. In general, images of (for example) ID-containing regions of a scene can be acquired more rapidly and, potentially with more appropriately adapted optics than available using the native capabilities of the device. With reference to the block diagram of FIG. 6, the arrangement of functional components of the module 100 is illustrated schematically. Within the main body/frame 110 resides the mobile device 130 and associated subframe 120. The mobile device 130 contains an appropriate communication interface 610 that enables communication via a connector, such as the above-described Apple Lightning or USB. The device 130 also includes a module application 612 that interacts with the operating system of the device to handle data 614 transferred over the communication interface. The application 612 can be implemented in accordance with ordinary skill, and includes processes for decoding ID-containing image data transmitted from the imager module 160. Alternatively, ID decoding can occur entirely within the on-board imager/illuminator processor 620 housed within the imager module 160. Where decoded ID code information is generated, it is transferred by the module circuitry 510, using appropriate communication protocols, to the device interface 610 and is further handled by the module application within the device. Such handling can include storage and manipulation of the data, correlating the decoded information with other data items, such as dates, times, locations, etc. and/or packetizing (e.g. TCP/IP packets) and transmitting the data with appropriate identifiers via a network link (e.g. Wi-Fi) to a remote handling device (e.g. server/PC 190 in FIG. 1). As noted, where image data is transmitted to the device interface, the application 612 can include (or interact with) a decoding application (such as a commercially available application) that identifies and/or decodes IDs and then performs the above-described storage and manipulation steps to the decoded data.

The module circuitry 510 also includes a charging circuit 630 that interacts with a charging unit 640, as described above, which delivers EM energy 642 to the circuit. The circuit 630 controls and manages charge and discharge in the onboard module battery 480 using, for example, conventional power-handling techniques. As described above, alternate charging connections, such as a direct electrical contact system can be employed in alternate embodiments. The circuit 630 also illustratively controls the delivery of power 649 to the device 130. Note that in an alternate embodiment, the charging circuit 630 and charging unit (charger) 640 removably interconnect (dock) using an appropriate electrical connector assembly that can be represented by the link 644 that transfers electric power 646 in an appropriate voltage and phase (AC or DC) to the charging circuit. The connector link 644 can also transmit data via the circuitry 510 and the charging unit 640 can act as a wired or wireless base station that interconnects (via network link 647) with other data handling devices/processors 648, including the above-described server/PC 190.

Figure 3:
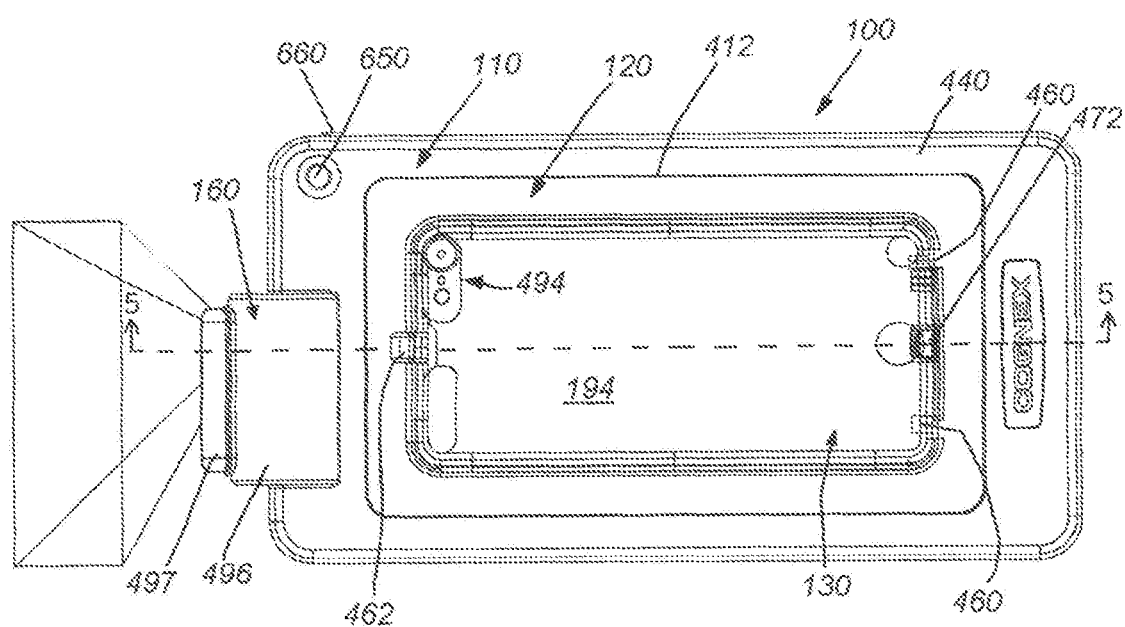
FIG. 3 is a top perspective view of the image module and handheld device of FIG. 1.

Notably, the main frame/body includes an indicator 650 that can be provided at a convenient and visible location (e.g. along the top face of the module) and that is controlled by the circuitry 510 (see also FIG. 3). This indicator 650 can flash in differing colors or patterns depending upon the status of the module—for example, a successful ID read can flash green while an unsuccessful read can flash red. Other states, such as low battery, system fault, etc. can be indicated by appropriate colors and flash patterns (e.g. fast blink, slow blink, solid color, etc.). Likewise module status can be displayed and/or accessed on the device touchscreen 194 using appropriate interface commands, or as part of the application's main screen. While not shown, an audible alarm can also be provided (e.g. a beep) via a speaker that is also controlled by the circuitry 510 and is mounted on the main body/frame 110.

The body/frame 110 also provides the user with a trigger button 660 that can be used to control image acquisition and/or scanning functions. Illustratively, pressing the button 660 causes the circuitry 510 to trigger image acquisition and follow-on processes (e.g. ID decoding) within the image module 160. The button 660 can be located (as shown in FIG. 3) in a position that allows ease of operation while the user grips and holds the module 100 relative to an object surface to-be-scanned—for example along a side of the module 100 near the front edge, where a user's thumb or forefinger can reach it. The button 660 is sealed against moisture intrusion using seals, etc. that can be conventional in the art.

The button can also be used to control other functions, such as device start-up, etc. The module application 612 instantiated on the device 130 can be adapted to interpret a button-generated signal from the circuitry to perform a predetermined device function. That is, upon startup, the initial button signal causes the device to "wake up" and begin running the application 612. The touch screen (194) can be operated to map other device functions directly to the button 660—for example, the button can be used to acquire images through the native imaging system on the device, or to place/hang-up a cellular telephone call.

In operation, the user activates the module application 612 and awaits system startup. The user then (optionally) manipulates the touch screen to select a desired function—such as scanning IDs. The user then proceeds to target a code on an object surface/imaged scene 670. The illumination assembly 680 can include one or more aimers (e.g. aiming LEDs) that assist the user in directing the optics 690 and image sensor 692 so that the optical axis OA is aligned with the target code (or other feature of interest—where a different type of vision operation is desired). The button 660 can be staged so that a partial press enables aiming and a full press triggers full illumination and image acquisition. Other techniques can be used to toggle between aiming and image acquisition. Once an image is acquired, it is handled by the module and the device in a manner described above. Information regarding a decoded ID (or other acquired image) can be displayed on the touch screen 194 after a successful scan/read.

Note that the subframe 120 (and/or circuitry 510) can include an optional authentication coprocessor 694, or similar element, residing within the data link arrangement between the module and the device 130. Where it is resident in the subframe, the device can be connected to a subframe-based connector that ties to the coprocessor 694, which is part of a subframe circuit arrangement. The subframe circuit is then connected to the main body circuitry 510 by another removable connector and (optionally) a cable arrangement. This coprocessor 694 can define a predetermined functionality, such as that specified by Apple, Inc. to facilitate communication between Apple devices and attached peripherals. The functions specified to facilitate communication are either publicly known to those of skill or can be made available by the device manufacturer. The subframe can also include appropriate interface conversion circuitry 695 that allows for conversion of voltage levels or other parameters, e.g. from one signal type, protocol and/or connector—for example USB, to another signal type, protocol and/or connector—for example, RS232.

II. Module with Replaceable Cover

Figure 7:
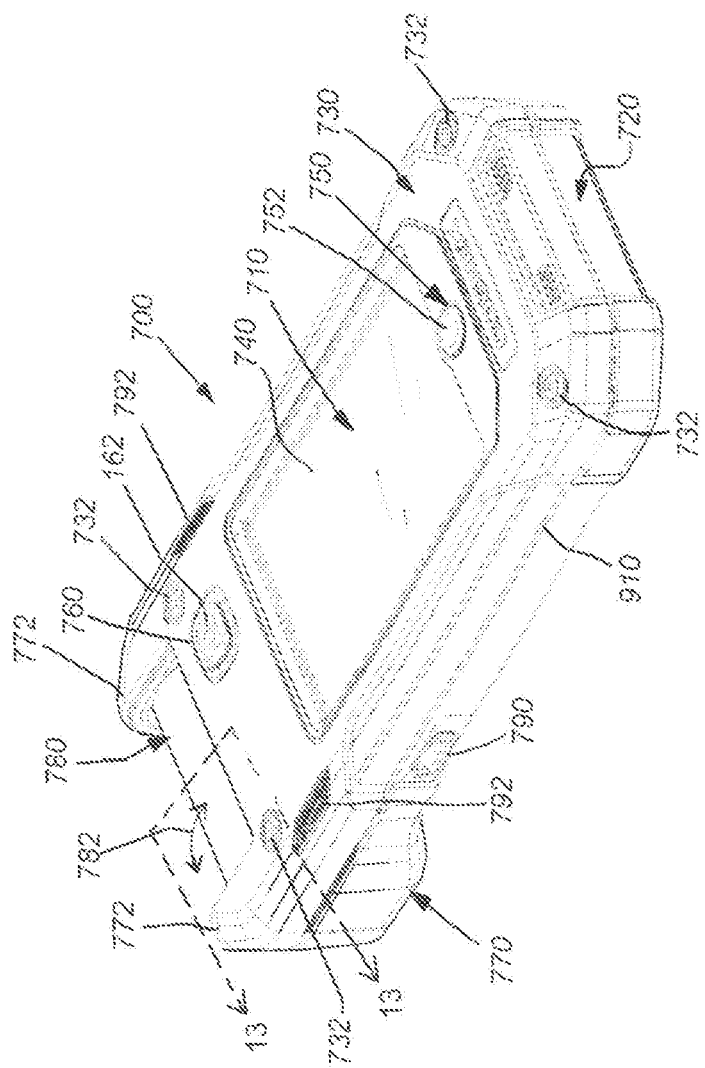
FIG. 7 is a perspective view of another illustrative embodiment water/weatherproof image module with a handheld device (e.g. an Apple iPhone®) mounted therein, in which a replaceable is employed to maintain the device with respect to the module.
Figure 8:
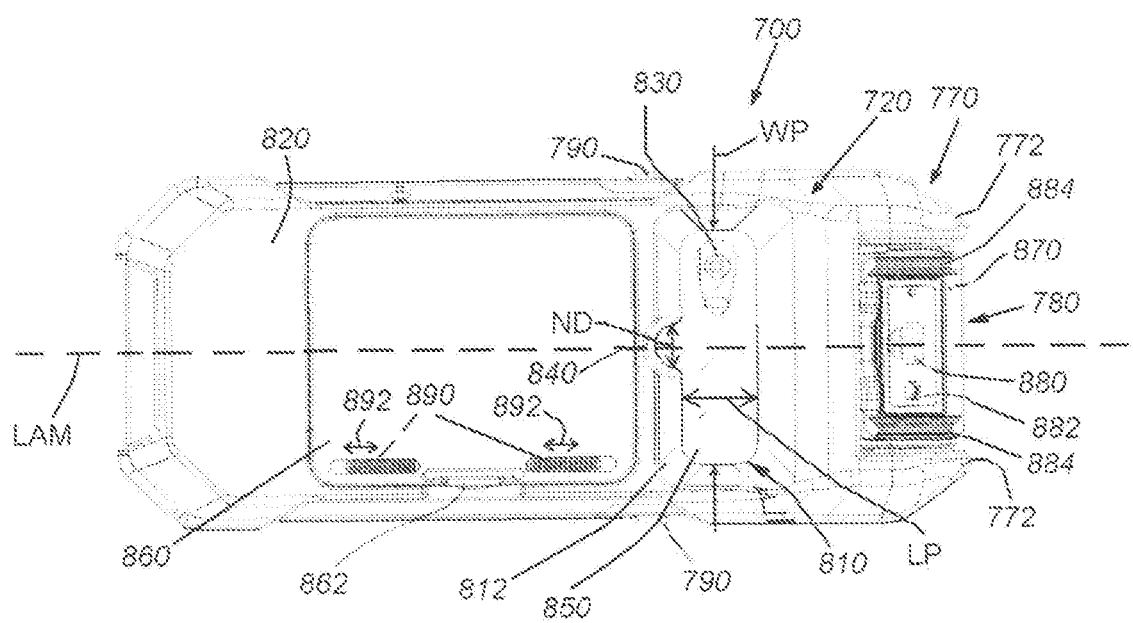
FIG. 8 is a bottom view of the module of FIG. 7.

Reference is now made to FIGS. 7 and 8, which show an image module assembly 700 according to another illustrative embodiment, in which the assembly is free of a subframe for holding a mobile device 710 (defined above). The overall assembly 700 in this embodiment consists of a base assembly 720 that contains various imaging, illumination, power, and associated electronic components, and a top cover 730, with the mobile device 710 sandwiched therebetween in a "clamshell" arrangement. The two outer members of this clamshell are secured together using four cap-head machine screws 732 (described further below) in this embodiment. A variety of alternate attachment mechanisms can be employed to secure the clamshell arrangement together including clamps, snaps, spring-loaded latches, and the like.

Figure 9:
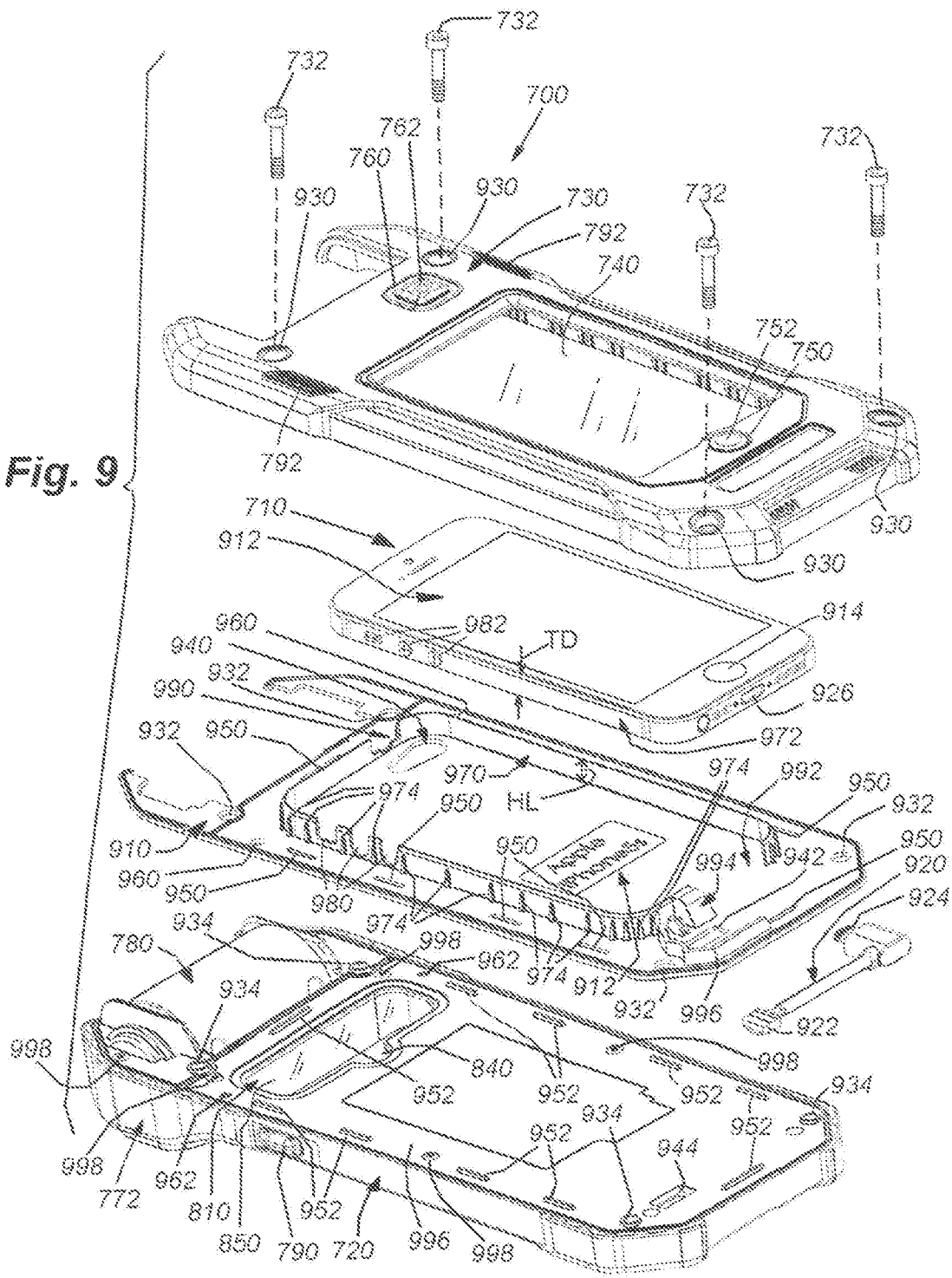
FIG. 9 is an exploded view of the module of FIG. 7 showing the handheld device, retaining gasket and interconnecting cable housed between a base assembly and replaceable top cover.

The top cover includes a transparent center window 740 that visually exposes, and allows manipulation of the device's touch screen graphical user interface (GUI—912 in FIG. 9). The window 740 can be constructed from any acceptable polymer that enables transmission of touch contact (typically capacitance, but alternatively pressure) by the user to the underlying GUI screen. In various embodiments, the window 740 can be constructed using a polymer that transmits capacitance or pressure, or can be constructed from a durable glass—e.g. so-called "Gorilla glass". As shown in FIG. 8, and in the manner described above, the base assembly 720 includes a port 810 through the bottom side 820 having a modified rectangular shape of sufficient width WP and length LP to accommodate the camera and illumination features 830 of the mobile device 710, or a variety of other commercially available devices, as described generally above. The edge 812 of the port 810 is outwardly beveled to provide clearance for a cone of illumination and the camera field of view, and also to reduce bounce-back of illumination light into the camera. Notably, the port 810 includes a semi-circular notch of sufficient diameter ND to accommodate the camera/illumination assembly of certain mobile device makes/models that place these components at this position. In general, the port edge is dimensioned so that it provides universal clearance for the camera and illumination assemblies for a wide range of mobile device makes and models. The port 810 can be covered (typically at its inner side) with a transparent window 850 that protects the device from debris and infiltration of dust/moisture, while allowing light to pass through so the camera feature of the mobile device is fully available to the user. This assists in increasing the weatherproof characteristics of the module 700 for use in industrial environments and/or outdoors.

The bottom side 820 of the base assembly 720 includes a removable hatch cover 860 that reveals a battery well (1210 in FIG. 12) with a conventional or custom rechargeable battery (e.g. a lithium polymer battery) that covers the module and device in a manner described above. The hatch cover 860 is removably locked in place by a unitary or integral live-spring latch 862 of conventional design. Additional safety latches 890 can be provided to prevent inadvertent opening of the hatch cover 860, and loss of the battery. The safety latches 890 are implemented as a pair of spring-loaded or friction-retained sliders that are moved between a locked and unlocked position (double arrows 892) to allow release of the hatch cover 860 by then biasing of the live-spring latch 862.

As shown further in FIG. 7, a sealed button assembly 750 is positioned on the top cover 730 at the lower end of the transparent center window 740. This sealed button assembly 750 includes a resilient button 752 that overlies the front "home" button on Apple devices (e.g. home button 914 in FIG. 9). This sealed home button assembly can be sealed with an integral or unitary elastomer. In general, the sealed home button assembly allows the user to readily operate the device home button free of the risk of debris and moisture infiltration to the device. Likewise, the top end of the top cover 730 includes a sealed on/off button 760 with appropriate indicia 762. The on/off button is positioned so that pressing it causes it to hinge against the device on/off button along its top side edge. As described further below, the dimensions, geometry and features (e.g. the home button assembly 750) of the top cover are particularly adapted to the make and model of device and particular features such as the size and shape of window layout, button placement, and the like can be varied to accommodate the particular device make and model. Some versions of top cover can include buttons that engage top surface device buttons—like the home button—while others use button arrangements that either directly or hingedly engage one or more side buttons. It should be cleat to those of skill, based upon the description provided herein how to implement both types of buttons on a top cover for a particular device. This arrangement, thus, allows for a largely universal application of the more-costly base assembly 720 to a variety of devices by employing a less-costly molded top cover and associated device-retaining gasket (described below).

Referring to both FIGS. 7 and 8, the front nose 770 of the module defines a pair of fork-like prongs 772 that extend forwardly and bulge downwardly. The prongs support the rotating/swiveling imager and illumination assembly (or "imager pod") according to the embodiment. As in the embodiment of FIG. 1, the imager pod 780 swivels (double curved arrow 782) in the prongs 772 between a position in which the imager optical axis is approximately aligned with a longitudinal axis (LAM in FIG. 8) of the module 700 and a position that is approximately perpendicular to the longitudinal axis LAM (i.e. viewing at a right angle to the elongated direction of the module 700). As will be described further below, the image pod 780 is electrically connected to the base assembly 720 via the prongs 772 using rotating contact rings and/or a flexible cable that complies with the swivel arc. The imager pod 780 includes a front face defining a combined viewing window and illumination light pipe 870 (FIG. 8). This window/light pipe 870 reveals internal components including a lens 880 (e.g. an M-12 lens), aiming LED 882 and illumination diffuser structure 884. As described below, the diffusers are part of a surrounding light pipe arrangement that is illuminated by (e.g.) six high-output LEDs on a circuit board residing behind the pipe 870 (described below).

Other features located on the base assembly 720 and cover 730 include opposing side function buttons 790 and indicator windows 792, respectively. These are each arranged symmetrically near the front end of the unit, and function generally as described above for the embodiment of FIG. 1.

Reference is now made to the exploded view of FIG. 9, which generally depicts the removable/replaceable components of the overall module 700 in a disassembled state. As shown, the module 700 breaks down readily into the top cover 730, mobile device 710, base assembly 720, as well as a retaining/sealing gasket 910 and cable assembly 920. Four cap head screws 732 secure the module together, with the gasket 910 sandwiched in a sealing arrangement between the top cover 730 and base assembly 720. The shafts of the screws 732 pass through holes 930 in the top cover 730 with recesses to seat the screw heads. The gasket 910 includes through-holes 932, which allow passage of the screw shafts therethrough. The threaded ands of the shafts seat in female-threaded holes 934 in the base assembly 720 that have a slightly raised lip to provide a standoff against which the top cover 730 engages when the gasket is compressed under biasing force of the tightened screws 732.

The gasket 910 and cable are purpose-built for the make and/or model of mobile device—in this example an Apple iPhone5s. An indicia 912 is provided on the surface of the gasket 910 identifying the type of device with which the gasket 910 is compatible. The gasket 910 is sized and arranged to conform to the perimeter of the base assembly 720 and top cover 730, and includes various cutouts, slots and holes that assist in aligning and securing the gasket to the base assembly 720; enabling passage of light to and from the device camera and illuminator (830 in FIG. 8); illumination of the top cover; and cable connection between the base assembly electronics and device 710. In particular, the gasket 910 includes a teardrop-shaped cutout 940 located to provide light passage for the device camera and illuminator. A rear rectangular cutout 942 provides passage for the plug end 922 of the connecting cable assembly 920 to engage a socket 944 at the rear of the base assembly. Note that the opposing end 924 of the cable assembly 920 is arranged with a standard connector/protocol, such as the Lightning™ connector used to interconnect the associated socket 926 of the depicted Apple device 710. The cable connector end and length of cable can be substituted for other makes/models of devices, such as the well-known micro USB format to interconnect a port located on the bottom or side of the associated device. The gasket also includes slots 950 that align with raised ridges 952 on the base assembly 720. A pair of opposing through-holes 960 align with optical indicator LEDs 962 that provide light to the two indicator windows 792 via appropriate interconnected light pipes in the top cover 730.

Figure 10:
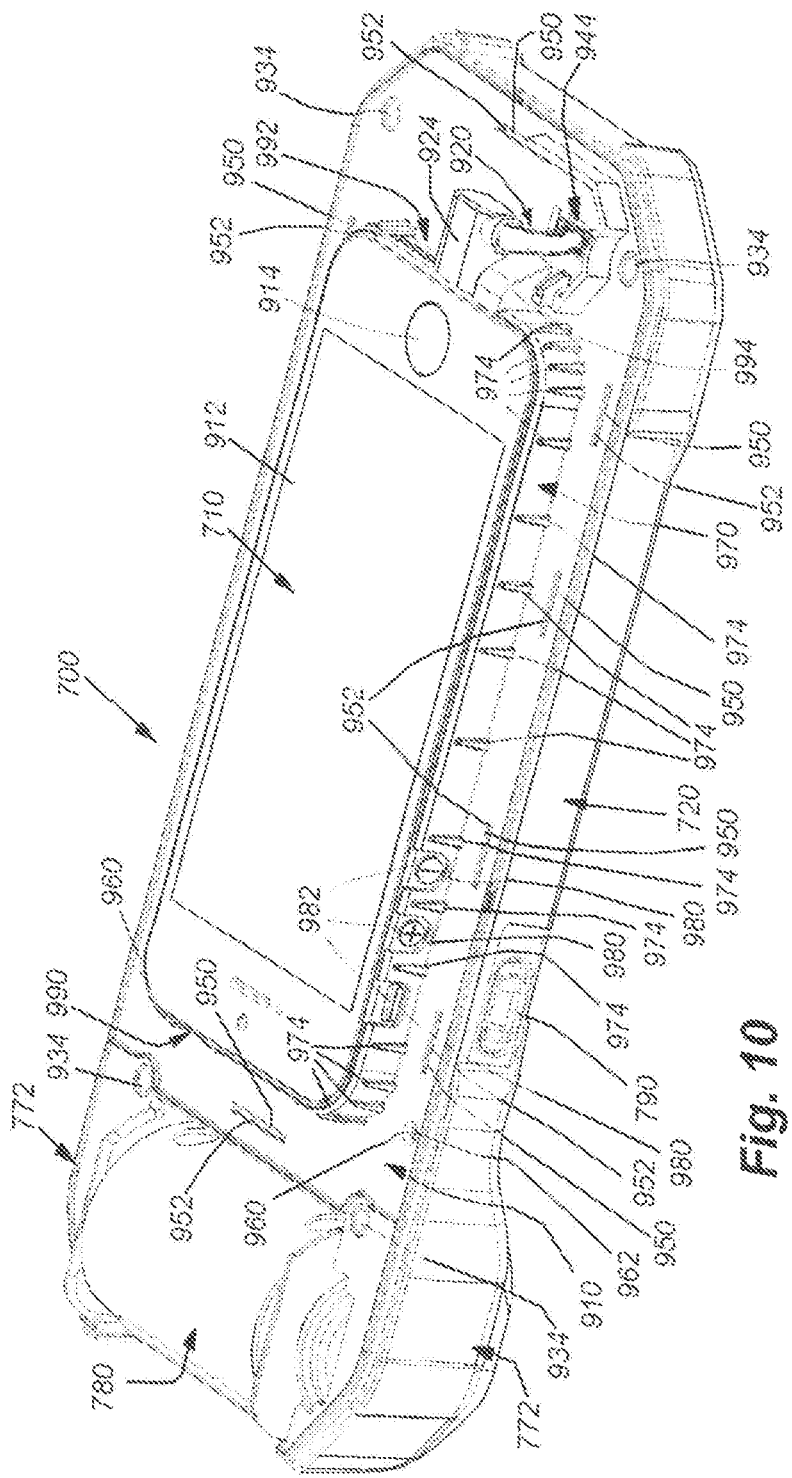
FIG. 10 is a perspective view of the module of FIG. 7 with replaceable top cover removed, exposing the retaining gasket engaging the handheld device.

With further reference to FIG. 10, where the top cover 730 has been removed from the module 700, the gasket 910 retains the device against lateral movement, and more generally provides enhanced shock and impact protection using a raised lip 970 that conforms with, and engages the side edge 972 of the device 710. The height HL of the lip 970 is approximately the same as that of thickness TD of the device 710. The lip 970 is generally smooth along its inside face to engage flushly against the device. Illustratively, the outside face of the lip 974 includes a plurality of small, triangular buttresses 974 that reinforce the lip 970 and provide further lateral shock absorption against the top cover when it is in place in the module. The lip 970 includes various cutouts 980 to accommodate function buttons 982, and protect (encapsulating) them against being pressed. Alternatively, a user can access these functions by toggling the base assembly function buttons 790 and/or via inputs to the device GUI touch screen 912. The gasket retaining lip 970 also includes a cutout 990 to allow the hinged on/off button to engage the device button located along its top side edge and a cutout at the bottom for the connector 924 to engage the device power/data (Lightning™) socket 926. A reinforcing buttress 994 is provided adjacent to the connector cutout 992, as well as other protective and guiding structures 996 to help guide the cable 920 and avoid it binding or kinking when the top cover 730 is placed into position in the module 700.

As depicted in FIG. 10, the device 710 is securely engaged by the gasket retaining lip 970 with the connector assembly 920 engaged in the module socket 944. Notably, the layout and arrangement of the base assembly and associated port 810 allows for ready replacement of the molded gasket, connector assembly and (when appropriate) top cover to accommodate a different make/model of mobile device without (free of) modifying the base assembly 720, or its functionality. Each particular mobile device is adapted to interoperate with the module indicators 792 and/or function buttons 790 based upon an instantiation of an appropriate device application. Such an application can be provided by the module manufacturer along with an appropriate gasket and top cover. A single top cover design can be applicable to a variety of makes/models or a specific top cover design can be provided for a range of makes/models with a specific gasket that adapts the mobile device to the top cover (for example, using a particular the lip geometry that fills gaps between a standard top cover and the gasket). Alternatively, the module manufacturer can provide a software development kit (SDK) the user that enables the end user to implement its own application (e.g. an ID-reading/scanning application).

Figure 11:
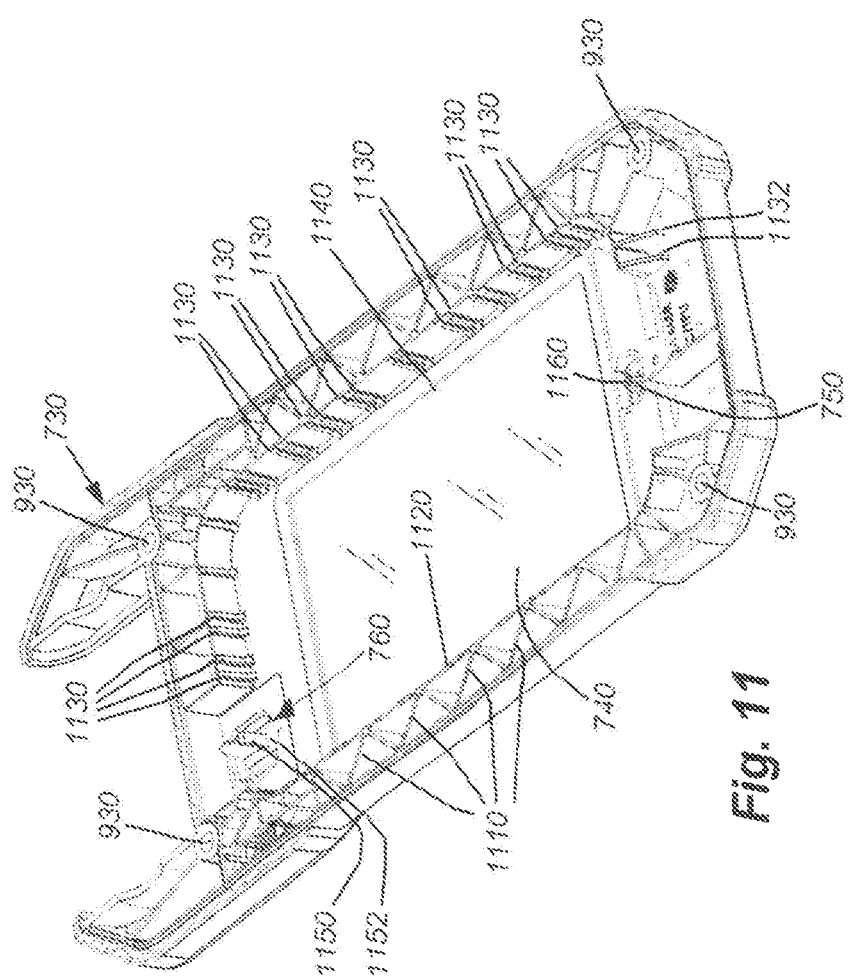
FIG. 11 is a bottom view of the replaceable top cover of the module of FIG. 7.

The interior of the illustrative top cover 730 is shown in FIG. 11. The top cover is typically molded from a polymer, such as ABS, acrylic or polycarbonate. Alternatively it can be constructed from a lightweight metal casting, such as aluminum, zinc or magnesium alloy. The illustrative molded top cover includes a plurality of stiffening ribs as shown that span between the outer edge 1110 and the inner edge 1120 in the region of the mobile device. These serve to lighten to structure and avoid a solid cross section that increases weight and the possibility of warpage. The inner edge 1120 is shaped to conform to the lip 970 of the gasket 910. The inner edge 1120 includes a plurality of inwardly projecting posts 1130 that are arranged to capture corresponding triangular buttresses 974 along the outer face of the gasket lip 970. Two larger and more widely spaced posts 1132 sandwich the bottom buttress 994 adjacent to the device connector 924 (FIGS. 9 and 10). This arrangement of interengaging buttresses and posts enhances the security between the gasket and top cover, and increases shock absorption therebetween. An edge seal 1140, formed typically from a compressible polymer, is arranged on the edge of the transparent window 740 and engages the perimeter of the touch screen 912 of the mobile device 710. The screen perimeter seal 1140 provides further protection against moisture and debris infiltration, and also enhances shock absorption. The on/off button assembly 760 is shown including a post 1150 mounted on a live hinge 1152. This hinge allows the post to hinge inwardly toward the device top power button when pressed. The home button 750 is also shown including a raised post 1160 that is arranged to bias the device home button when pressed.

Figure 12:
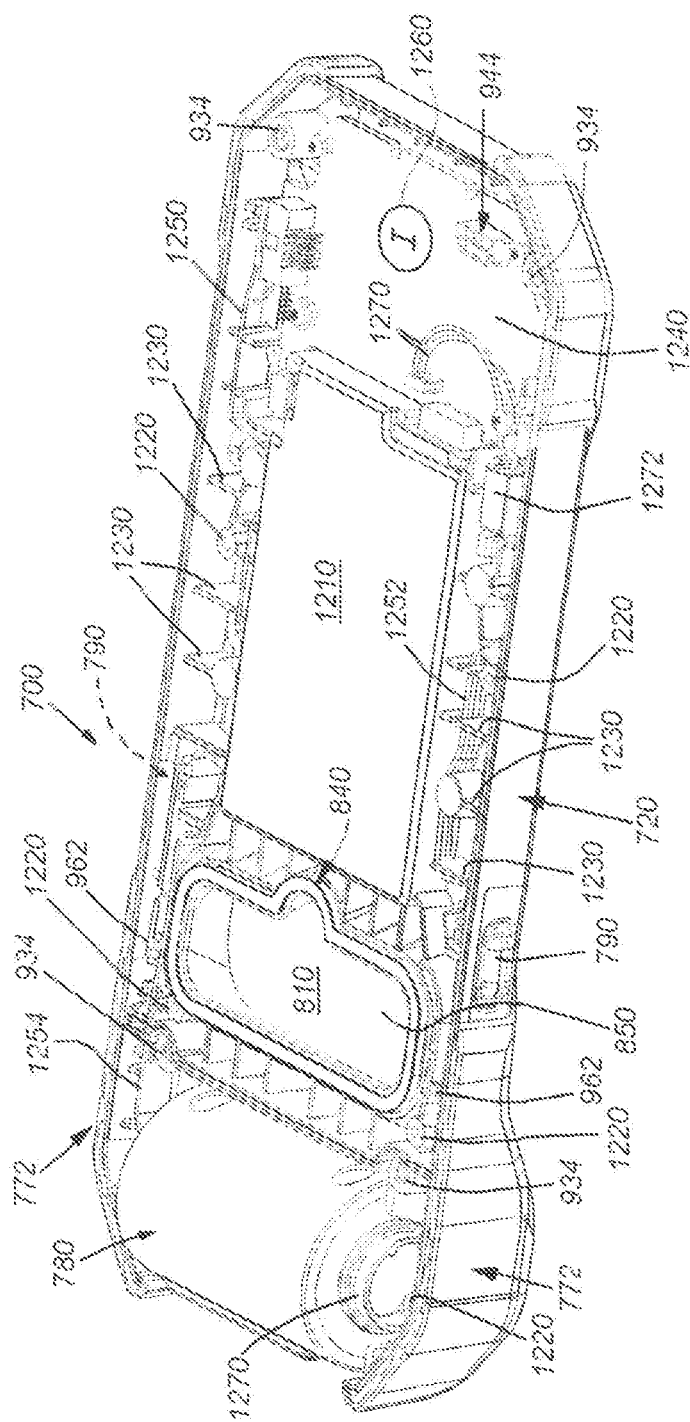
FIG. 12 is a perspective view of the base assembly with cover plate removed to expose the internal electronic and power components of the module.

FIG. 12 shows the base assembly 720 with the cover plate assembly (996 in FIG. 9) removed. The cover plate assembly 996 is illustratively detached from the underlying portion of the base assembly 720 by removing associated screws 998, which are threaded into posts 1220 (FIG. 12). The exposed interior of the base assembly reveals various stiffening ribs 1230 that extend between the outer shell and an inner battery well 1210. The battery well is closed on the top as shown and open on the bottom (See FIG. 8). Electrical contacts pass to a main module circuit board 1240 (at the rear of the module base assembly 720) that also carries the device cable connector port 944. In addition a pair of ribbon connectors 1250 and 1252 extends from the board along each opposing side of the base assembly 720 through various ribs 1230. Each ribbon cable 1250, 1252 interconnects to one of the function buttons 790 and user interface indicator LEDs 962 on the respective side of the base assembly 720. In addition, a separate, flexible ribbon cable 1254 extends along one side, and interconnects the circuit board 1240 with the swiveling imager pod 780 as described further below. This cable 1254 thus, interconnects data and power functions/interfaces between the pod 780, the module buttons/indicators 790, 962, and the mobile device 710. The main circuit board 1240 also includes an inductor coil (I) 1260 shown schematically. This coil can reside on the underside of the board 1240 and allows an inductive transfer of charging energy from a base station as described above (and further below). The circuit board also interconnects, via cables 1270 with an electronic vibration element that transmits tactile vibrations through the module to the user when certain actions occur (e.g. successful/unsuccessful ID-read, power-up, power-down, etc.). The circuit board 1240 can also include an integral on-board beeper (not-shown) of conventional design to provide audible feedback for various events, such as successful or unsuccessful ID-reads.

Figure 13:
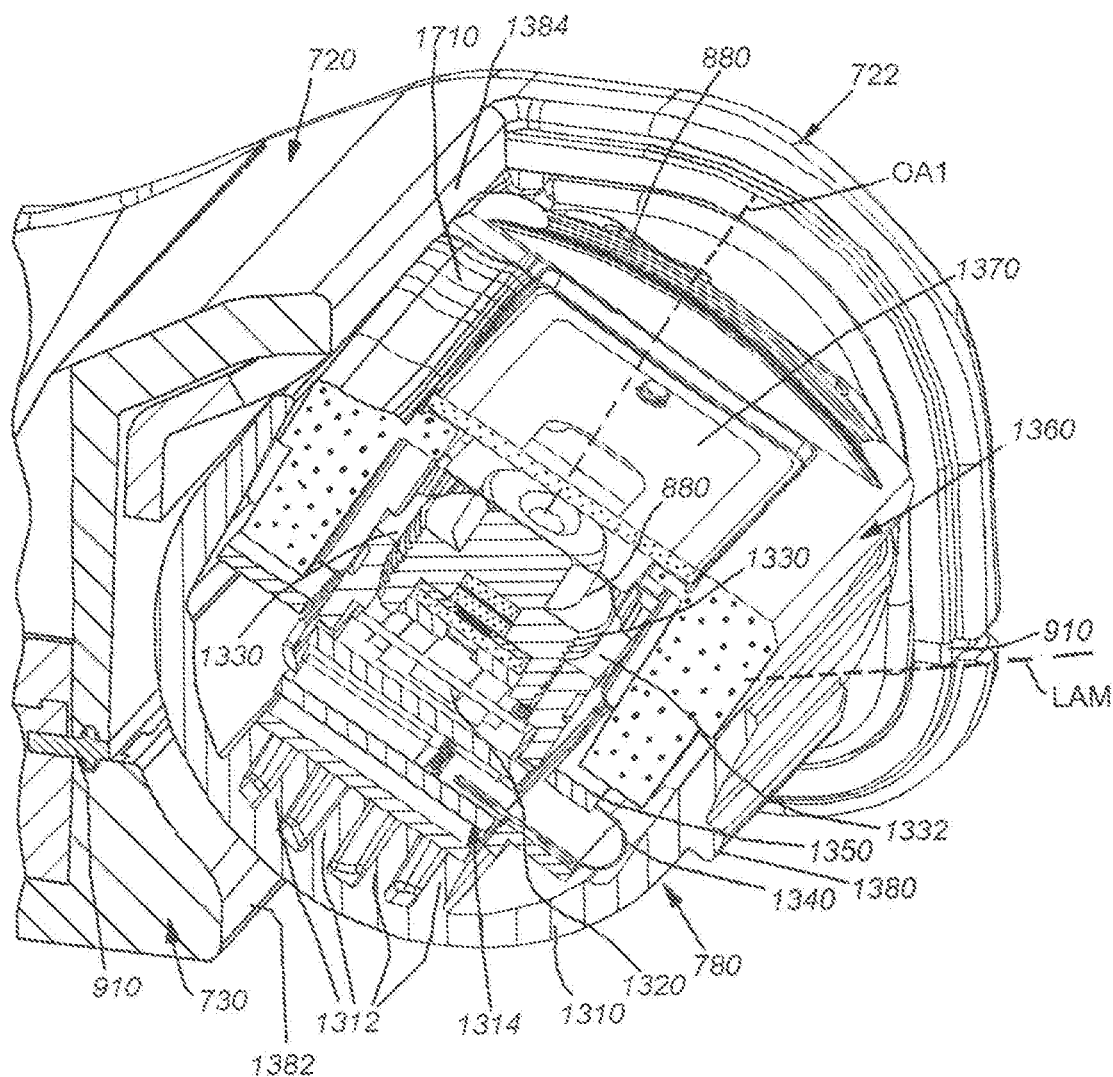
FIG. 13 is a partial cross section of the swiveling imager and illumination assembly taken along line 13-13 of FIG. 7.
Figure 14:
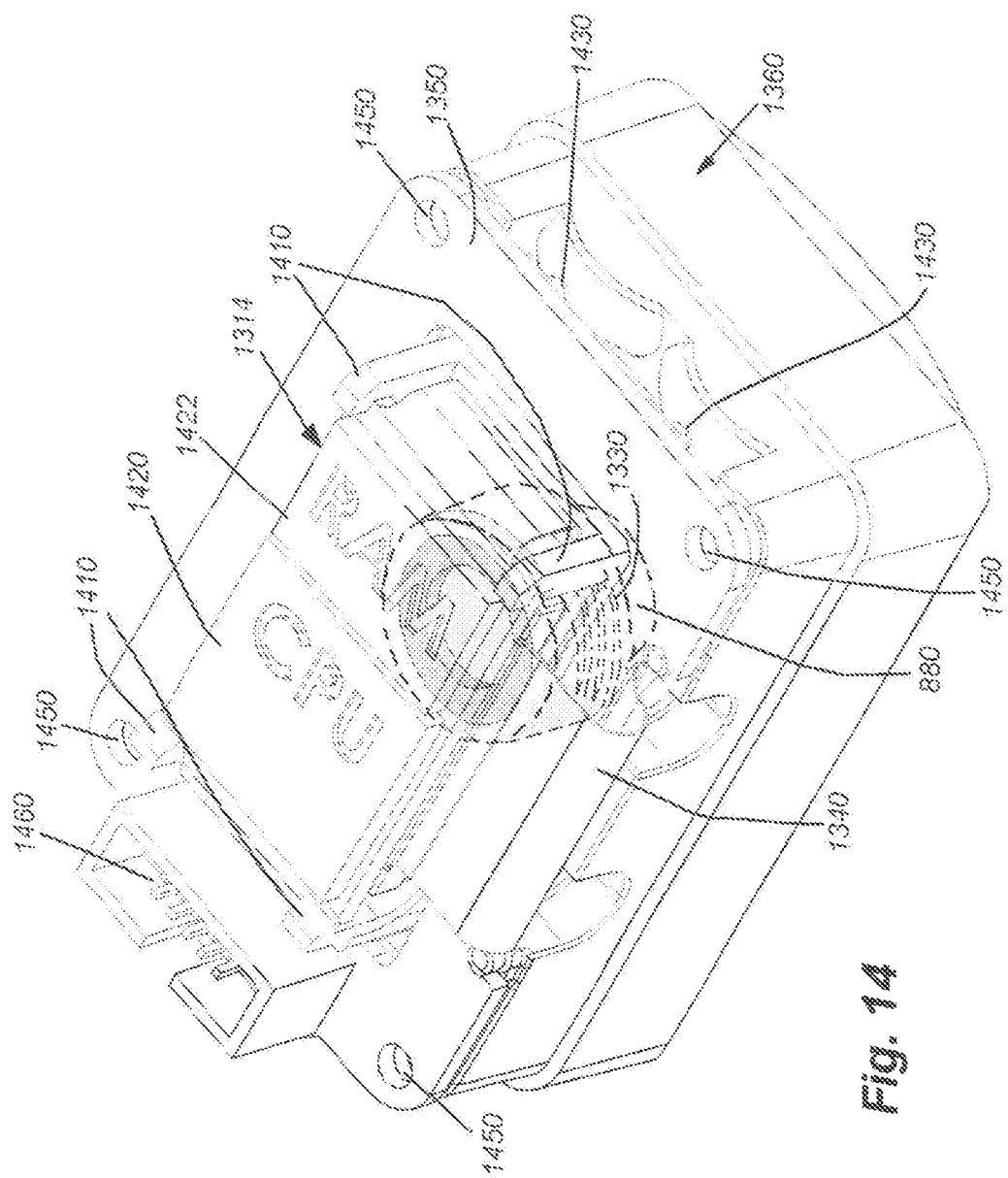
FIG. 14 is a bottom-oriented perspective view of the swiveling imager and illumination assembly of FIG. 13.
Figure 15:
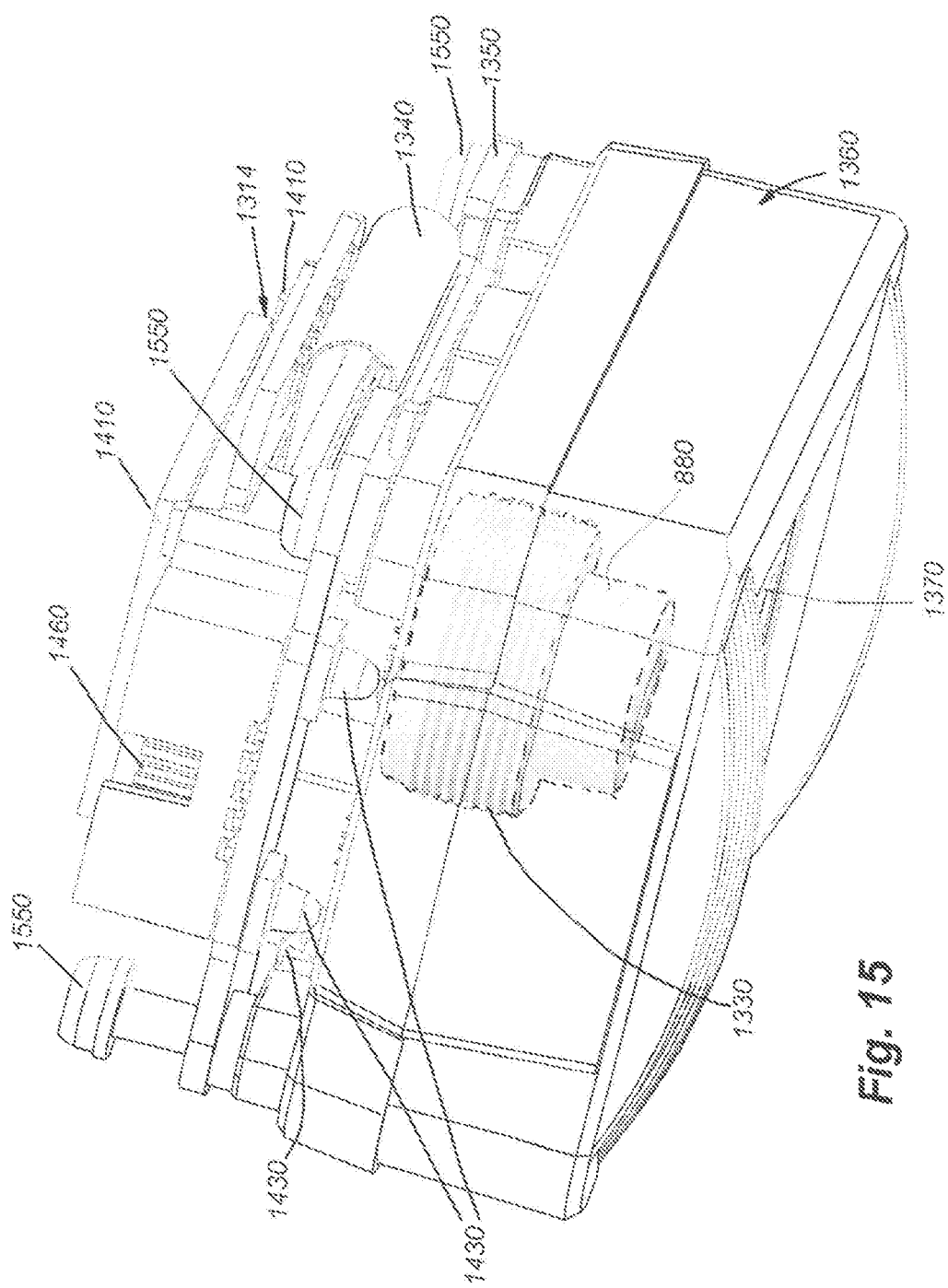
FIG. 15 is a side-oriented perspective view of the swiveling imager and illumination assembly of FIG. 13.

Reference is now made to FIGS. 13-15, which detail the imager pod 780 in various views and orientations. In FIG. 13, the pod 780 is shown in cross section with the module turned so that the top cover assembly 730 faces downwardly. The pod 780 includes a semi-cylindrical barrel 1310 that can be constructed from a variety of materials, such as aluminum alloy, and includes internal heat-sink ribs 1312 that engage the bottom side of the imager pod circuit 1314. The circuit is held in place by a prong assembly 1410. The circuit 1314 includes a processor 1420 and data memory (RAM) 1422 as shown. The circuit includes an image sensor 1320 that is in optical communication with the lens assembly 880. The lens assembly includes a threaded body 1330 that engages a base 1330. The base can be fixed or, illustratively, can be driven by appropriate motors that move the lens along the optical axis OA1 to allow mechanically-actuated auto-focus capabilities. Alternatively, a variable focus system based on a liquid lens technology can be employed in the lens arrangement. For example a liquid lens using two iso-density fluids is available from Varioptic SA of France. A liquid lens based on a moving membrane is available from Optotune of Switzerland.

The circuit 1314 is connected by a flexible extension portion 1340 of a perimeter illuminator circuit board 1350. The illuminator circuit board surrounds the image sensor 1320, RAM 1422 and processor 1420. The illuminator circuit board 1350 includes (e.g.) six high-output LEDs 1430 arranged in pairs around three of the four sides of the pod. The LEDs project light of a predetermined range of wavelengths (or combination of wavelength ranges) into a molded, translucent light pipe structure 1360.

Figure 16:
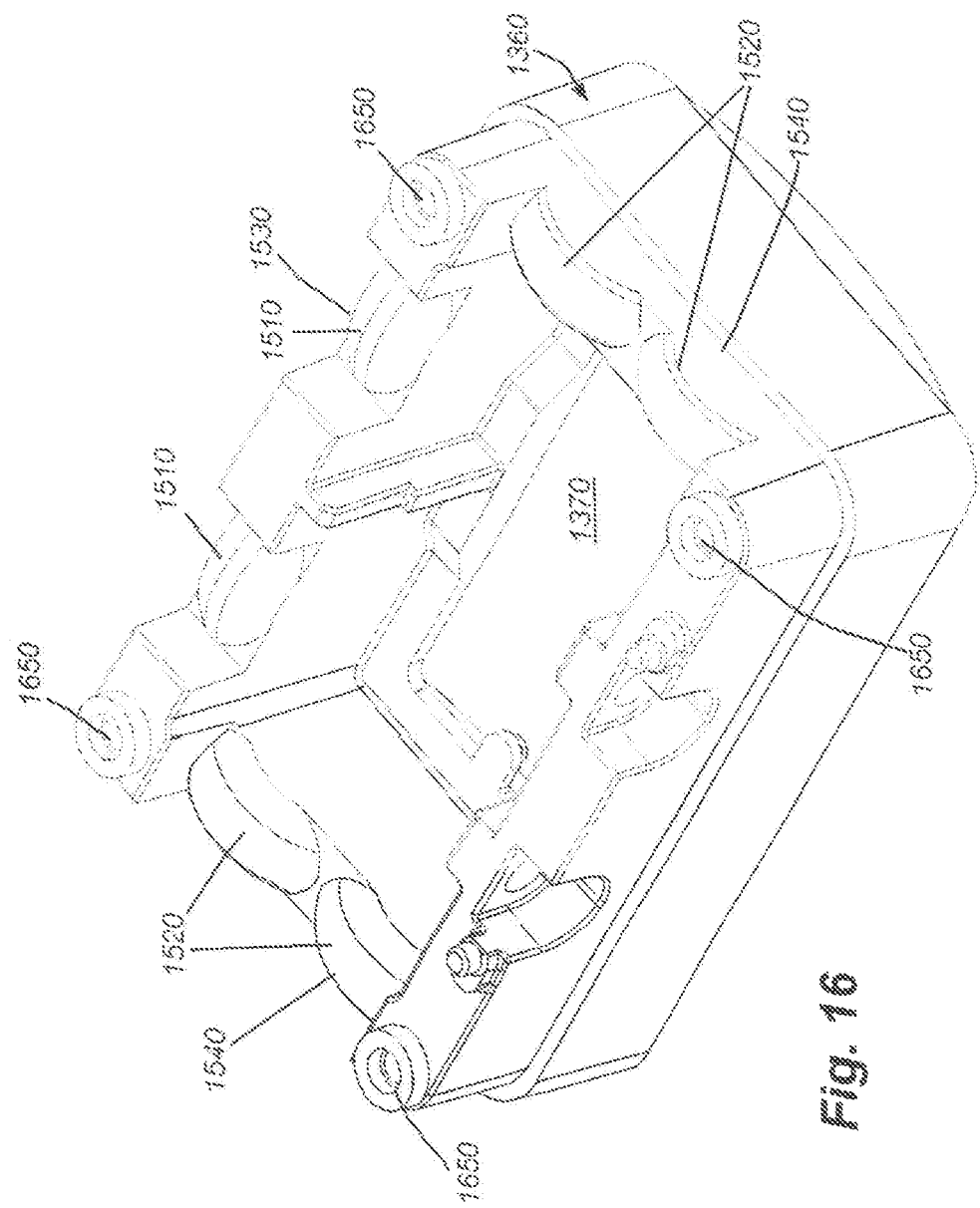
FIG. 16 is a bottom-oriented perspective view of a viewing window and illumination light pipe of the swiveling imager and illumination assembly of FIG. 13.
Figure 17:
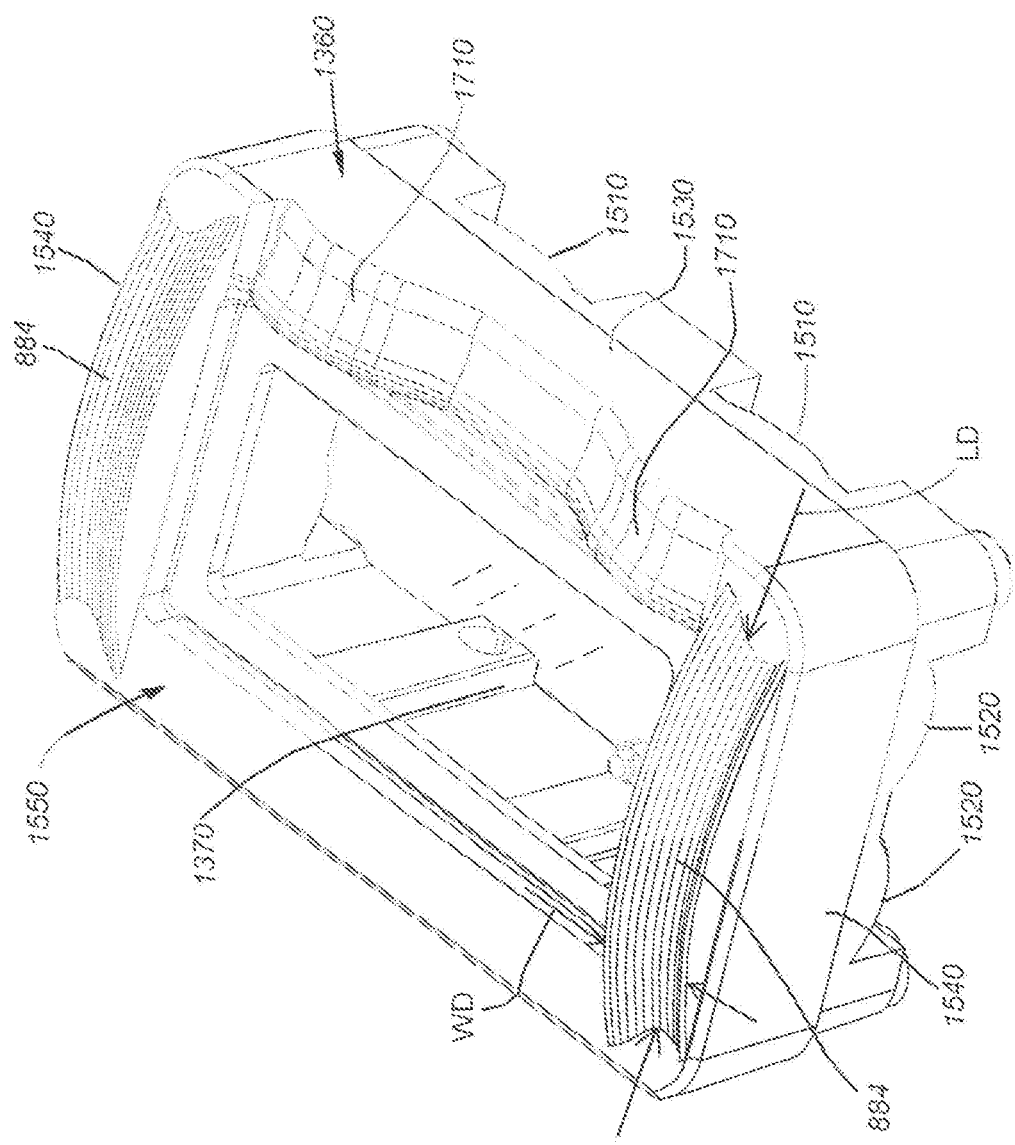
FIG. 17 is a top-oriented perspective view of the viewing window and illumination light pipe of FIG. 16.

The light pipe structure 1360 is shown in further detail with further reference to FIGS. 16 and 17. The light pipe structure 1360 can be constructed (e.g. molded) from any acceptable transparent or translucent polymer—for example polycarbonate or acrylic. The LED-facing side includes rounded (semi-dome-shaped) lenses 1510 and 1520 along one long 1530 and two opposing short sides 1540, respectively. Light is transmitted internally through the pipe to exit on the front face 1550 along the perimeter, which consists (illustratively) of two crenelated diffusers (on each side 1540) that each define a concave/dished shape across its width WD and a convex shape along its length LD, as shown. This geometry effectively spreads light around the imaged scene. Additional light is transmitted from the front face on the long side 1530 of the pipe 1360 by a pair of dished, convex lenses 1710. The lens pattern shown is illustrative of a wide variety of possible arrangements. A wide variety of surface finishes can also be employed (e.g. smooth, frosted, etc.) on portions of the light pipe to condition transmitted illumination light. The center region of the light pipe defines a transparent viewing window 1370 through which the image views the scene and the aiming LED 882 projects an aiming spot on the target. The viewing window 1370 can include a lensmatic structure, as appropriate to optically enhance the aiming LED light, the received light entering the lens, or both. The light pipe 1360 includes screw holes 1650 (FIG. 16) that secure the circuit 1314 and illumination board 1350 to the pipe using screws 1550 (FIG. 15). These screws, in particular pass through holes 1450 (FIG. 14) in the illumination board 1350. The illumination board 1350 also supports a male multi-pin connector 1460 that is operatively connected to the circuit 1314. This connector interconnects a corresponding female connector (not shown) mounted on the end of the flexible ribbon cable 1254 (FIG. 12) and allows the pod 780 to swivel while the cable flexibly twists to accommodate the range (e.g. approximately 90 degrees) of swivel rotation. Cylindrical mounting rings 1270 (FIG. 12) on opposing ends of the pod 780 that engage bearing structures formed on the prongs 772 of the base assembly 720. As shown in FIG. 13, the barrel 1310 can include at least one stop ridge 1380 that engages the front edge 1382 of the top cover 730 when the optical axis OA1 is located directly in line with the longitudinal axis LAM (i.e. the pod imaging straight forward from the module body). The ridge can be located against the front edge 1384 of the base assembly 720 when the optical axis OA1 of the pod 780 is rolled 180 degrees completely into the module (i.e. facing the interior), which serves to protect the light pipe 1360 and associated window 1370 when not in use. In general, the position of the pod optical axis OA1 during use is between 0 and 90 degrees (downwardly) with respect to the module longitudinal axis LAM.

In practice, the range of swivel rotation during use can be between approximately 0 and 70 degrees.

It should be clear that the arrangement of circuit components and associated optics, illumination and mechanisms within the imager pod 780 can be varied from the arrangement shown in FIGS. 13-16 in a manner clear to those of skill.

Figure 18:
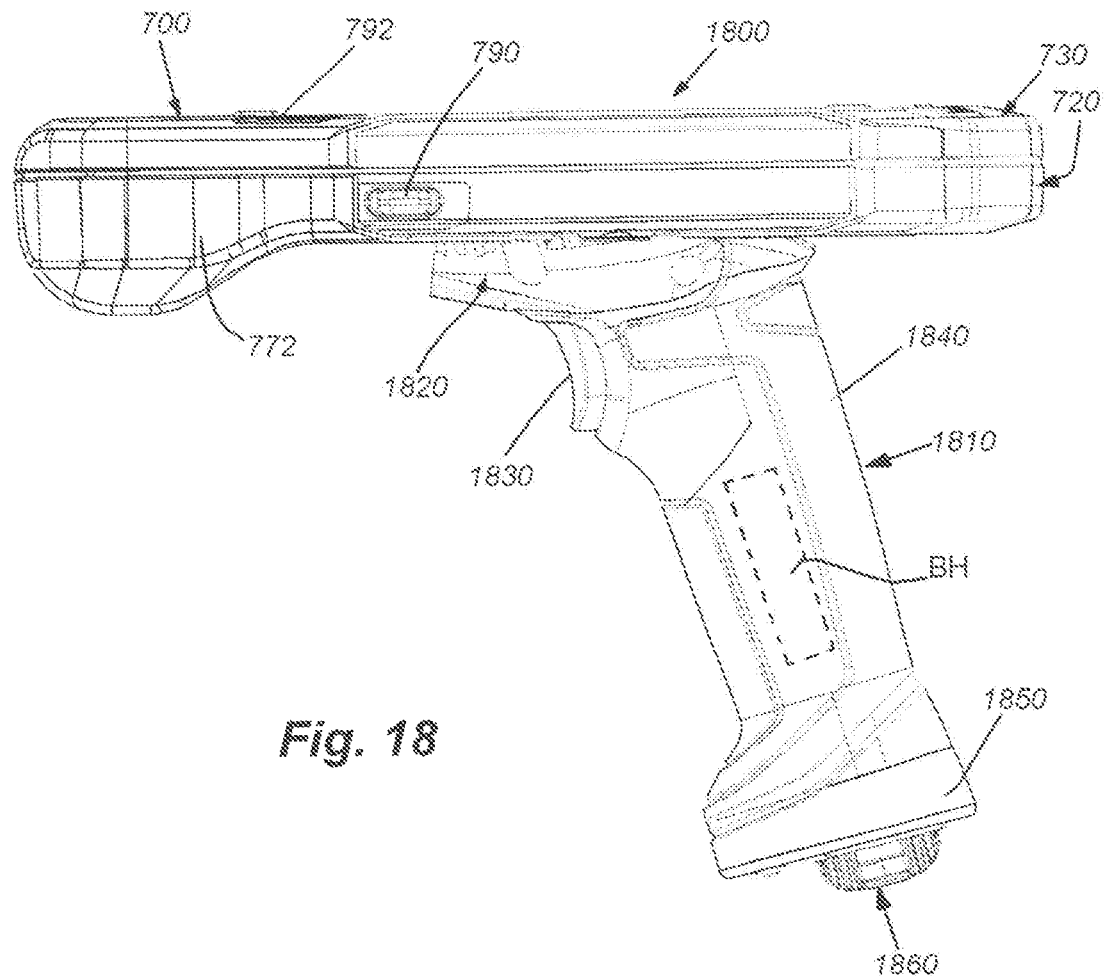
FIG. 18 is a side view of the module of FIG. 7 including an optional, removable handle assembly with associated trigger and power supply according to an illustrative embodiment.
Figure 19:
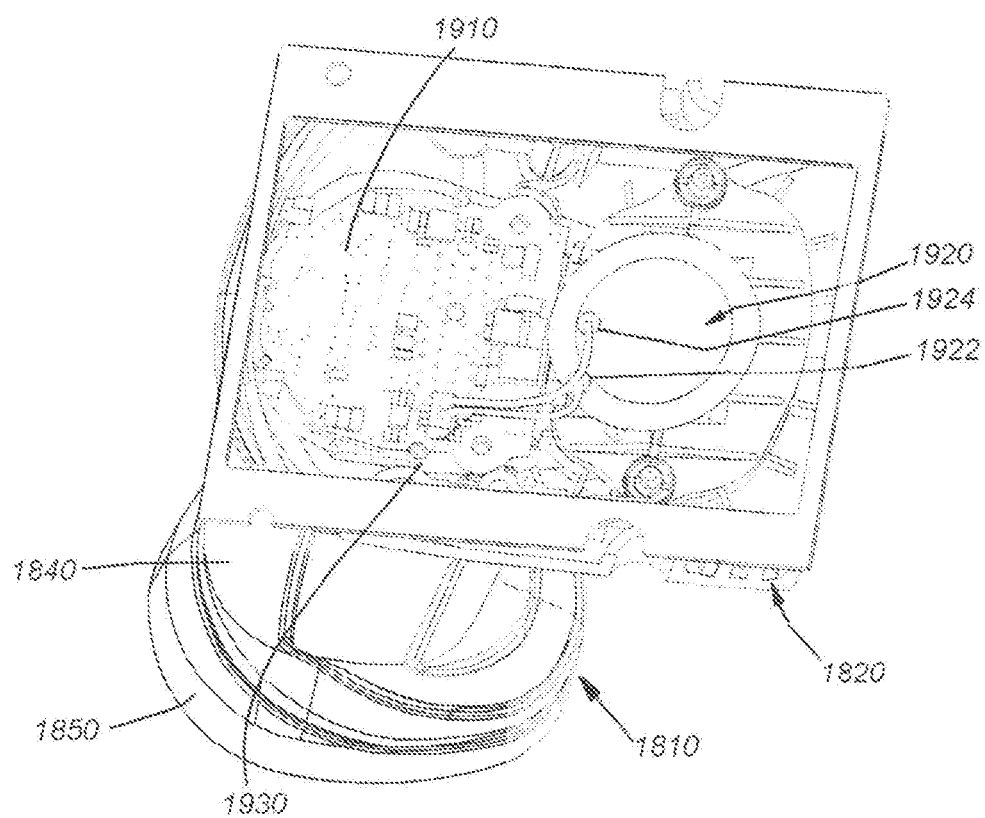
FIG. 19 is a top view of the handle assembly of FIG. 18 showing electronic components housed therein.

Reference is now made to FIGS. 18-19 that show the use of an optional grip handle assembly 1810 in combination with the module 700 described above. This arrangement 1800 allows the module to be used in a different ergonomic configuration that can be desirable for the user in certain applications. The grip handle assembly 1810 comprises an attachment base 1820, trigger switch 1830, elongated gripping member 1840 and bottom 1850. The body of the grip handle 1810 can be molded or cast from polymer or metal. The grip handle attachment base 1820 can be removably secured to the bottom of the module 700 by removing the hatch cover 860 (FIG. 8) from the battery well, and inserting the handle into the well. It is secured into the well by screws or other fasteners (e.g. snaps, latches, etc.). The grip handle (within its attachment base) can include a circuit board 1910 (FIG. 19) that can be used to interface the trigger switch 1830 with the module via interconnections in the battery well. In an embodiment, an appropriate internal cable or an arrangement of spring loaded contacts (not shown) can be used to removably interconnect the handle circuit board 1910 and associated battery power supply to the module 700. Optionally, the grip handle also houses a beeper and/or vibrator 1920 that is operated by signals generated by the circuit board 1910. This beeper/vibrator is activated by the trigger switch 1830, or by other signals that originate in the module 700. Contacts 1922 and 1924, on the beeper 1920 are connected by a cable 1930 to the circuit board 1910. The bottom 1850 can include a plug assembly 1860 that allows for connection to a charger and/or data interface so that data can be transferred between a remote processing unit (e.g. a networked PC or server) and the module/mobile device. The plug assembly 1860 can interconnect to a removable battery B (shown in phantom) that provides further electrical power to the overall arrangement 1800 for extended use. In an embodiment, the plug assembly 1860 is rotated to remove it from the bottom 1850 of the grip handle 1810.

The trigger switch 1830 of the grip handle assembly 1810 can be constructed as a single stage unit—in which pressing activates one function (e.g. an ID-reading function), or as a multi-stage trigger, where pressing part way causes the system to illuminate the aimer LED and/or illumination assembly and focus the lens; and pressing completely causes an ID-reading task to occur.

Note that the dimensions of the overall module and grip handle assembly are highly variable. In an embodiment the dimensions can be proportioned as generally depicted to accommodate the illustrative mobile device. The grip handle can be proportioned in the manner of a conventional handheld ID reader to accommodate an average adult hand and fingers. More generally, the module is dimensioned to enclose the largest mobile device that is anticipated to be employed. In an embodiment this can comprise, for example an Apple iPhone 6 or Samsung Galaxy 5s smart phone. Larger or smaller form factor mobile devices can be accommodated in alternate embodiments.

Figure 20:
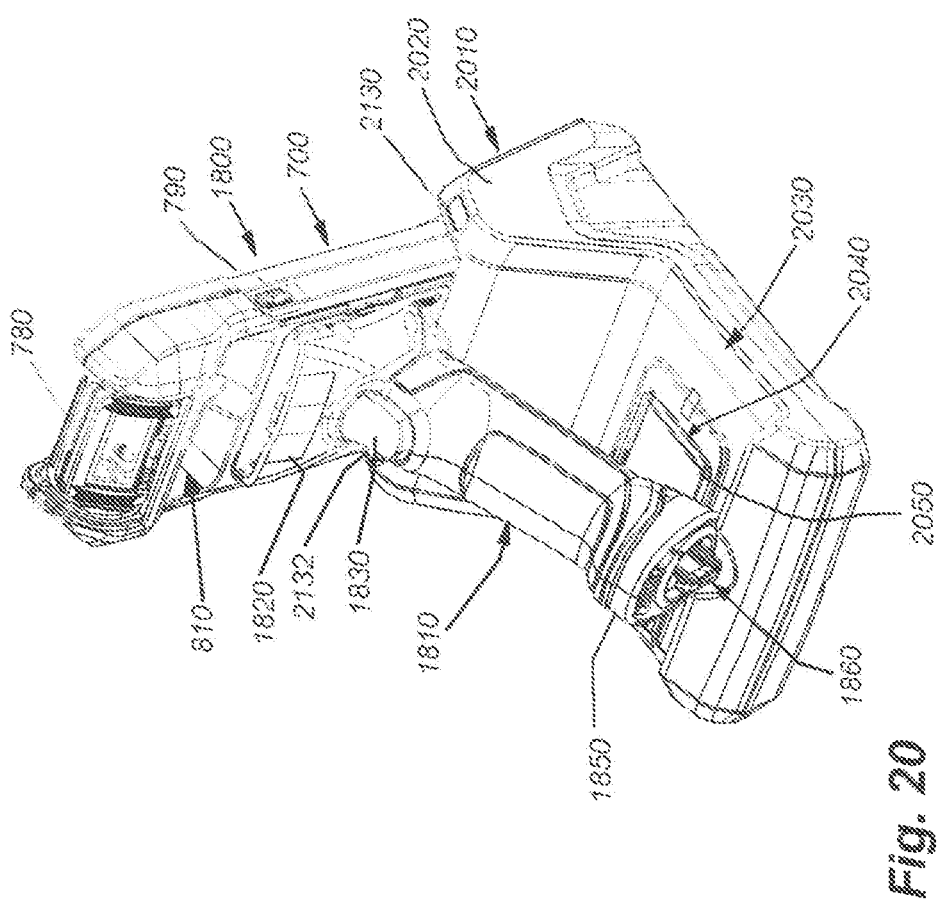
FIG. 20 is a perspective view of a the module with handle assembly of FIG. 18 mounted on an inductive charging unit according to an illustrative embodiment.
Figure 21:
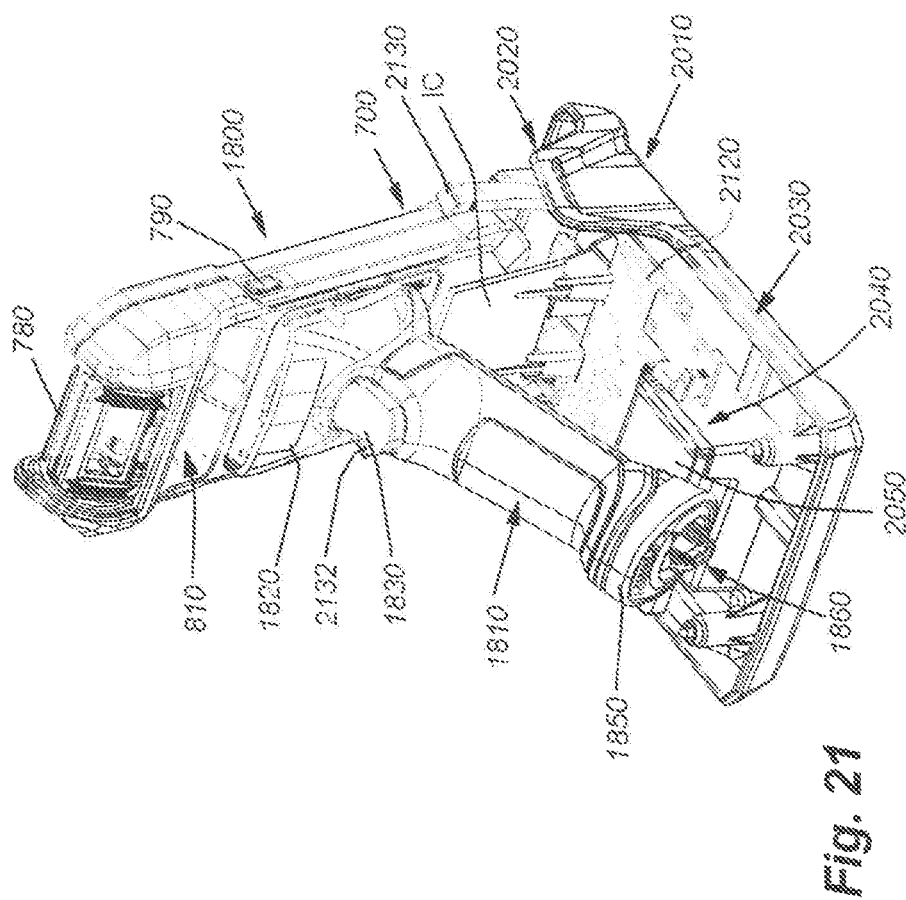
FIG. 21 is a exposed perspective view of the inductive charging unit of FIG. 20 showing the top cover removed.

Reference is now made to FIGS. 20 and 21 that show a charging base unit 2010 into which the rear end of the module 700 is seated. Which shown in the arrangement 1800 with attached grip handle 1810, the charging base unit 2010 will receive and charge the module with or without the grip handle 1810 attached. The module is supported in an upright well section 2020 that includes a well shaped to conform to the rear of the module. A front area 2030 of the charging base unit 2010 provides stability to the overall unit and also provides a charging well 2040 for the module battery 2050 when removed from the module 700. As shown in FIG. 21, a circuit board 2120 (FIG. 21) controls conversion of power from (e.g.) AC wall current to AC or DC charging current for both the battery 2050 and the module 700. To charge the module, the circuit board provides power to an induction coil IC that is oriented to confront the rear bottom of the module and thereby transmit induction energy to the module coil 1260 (I in FIG. 12). The circuit board 2120 drives a pair of illuminators (e.g. light pipes) 2130 and 2132 on opposing sides of the upright well section 2020. These illuminators indicate when the unit is charged and/or charging by, for example, displaying blinking or solid lights and/or different color lights (e.g. red/green/yellow/blue). Other status information can also be displayed by the illuminators 2130, 2132, such as whether the module 700 and/or battery 2050 is attached to the charging unit 2010.

Figure 22:
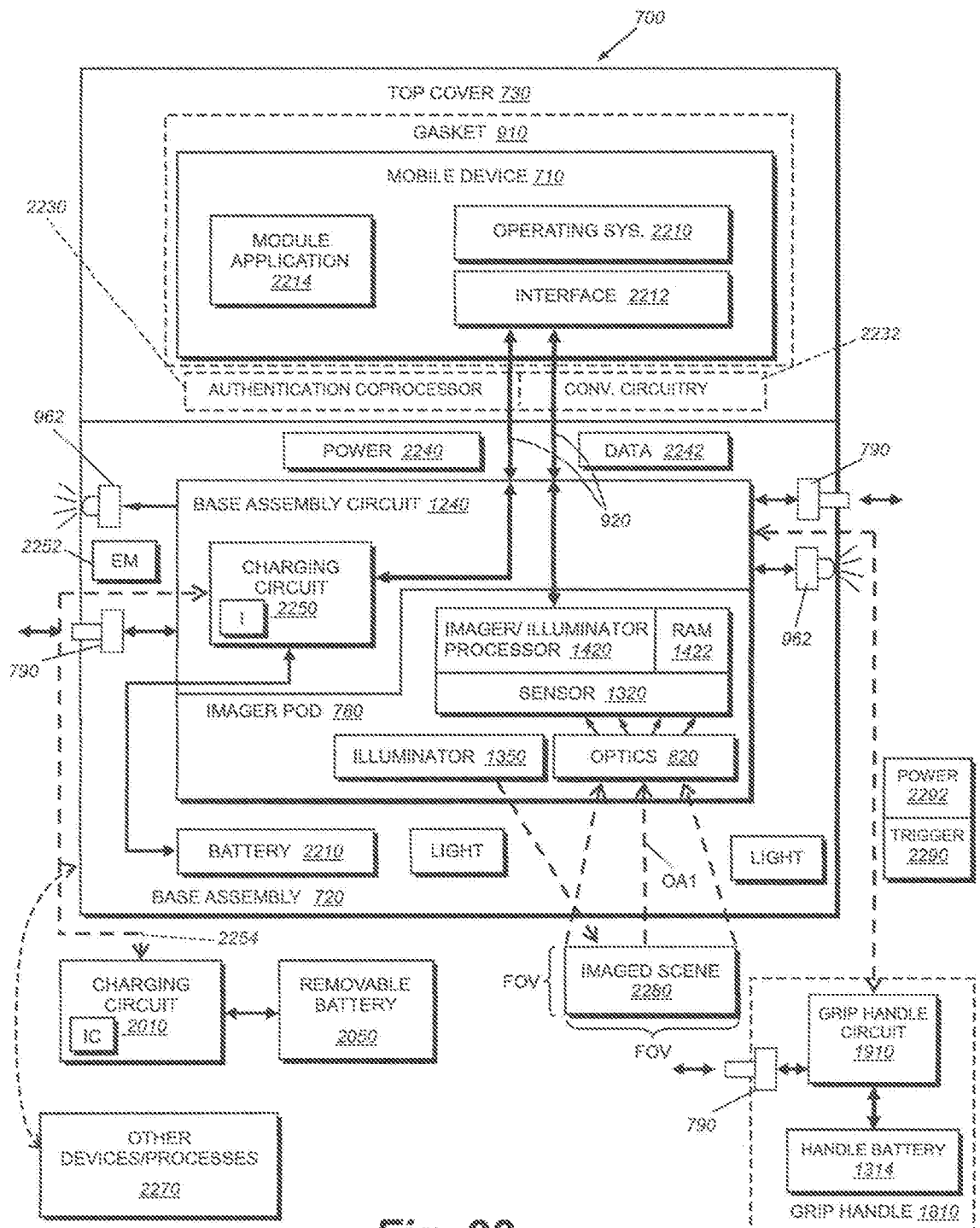
FIG. 22 is a block diagram showing the functional components, processes and processor of the image module and the handheld device of FIG. 7 with additional grip handle and charging unit of FIGS. 18-21.

Having described various hardware and electronic components of the module 700, associated grip handle 1810 and charging unit 2010 of the illustrative embodiment, FIG. 22 shows a generalized circuit diagram of the overall module 700, grip handle assembly 1810 and charging unit 2010. The arrangement is similar to that described above with reference to FIG. 6. Generally, the image module 700 is divided into the top cover 730 and gasket, which enclose the mobile device 710. The mobile device includes an operating system 2210 and interface 2212 that interconnects with the connector assembly 920. A mobile application 2214 that is customized to the device and module is also installed and interoperates with the operating system 2210. The device, cable assembly and/or module can include an appropriate authentication coprocessor and/or conversion circuitry as described above. The cable assembly 920 transfers power 2240 and data 2242 to the base assembly circuit 1240 (within the body of the base assembly 720). The base assembly circuit 1240 includes a charging circuit 2250 with induction coil I. This circuit communicates wireless to deliver electromagnetic energy EM 2252 from the charging unit 2010 and associated coil IC over a gap defined by dashed line 2254. The charging unit 2010 also transfers electrical energy to the removable module battery 2050, typically via direct electrical contact to the battery's contact pads. The module charging circuit 2250 also charges, and draws power from, the on-board rechargeable battery 2260, which resides in the above-described battery well in the bottom of the base assembly 720. Function switches 790 and optical indicators (or illuminators or LEDs) 962 are interconnected with the base assembly circuit 1240 and operate as described above. Also, as described above, a beeper 2268 interfaces with the circuit board 1240.

In FIG. 22, the imager pod 780 is interconnected to the base assembly circuit 1240, and transfers data to and from the mobile device 710 as shown. The imager pod 780 processes image data from the sensor 1320 using the processor (CPU) 1420 and associated memory (RAM) 1422. This processed (and/or pre-processed) image data is transferred, over the connections described above, to the mobile device for further processing and handling. Image data is generated by the sensor 1320 from light returned from the imaged scene 2280 along the optical axis OA1 through optics (i.e. the lens 880). The scene 2280 is illuminated by the illumination board 1350 through the above-described light pipe. Communication with other devices and processes 2270 that employ the data (e.g. a logistics system or inventory tracking system) is accomplished by a variety of modalities including wired and wireless connections (e.g. Wi-Fi, SMS, CDMA, etc.) that are provided by the mobile device 710 and/or the base assembly circuit 1240.

Optionally, the base assembly circuit 1240 is operatively connected to the grip handle circuit 1910 and handle battery BH. The trigger switch 1830 interfaces with the handle circuit 1830. Data generated by the trigger signal 2290 is transmitted to the base assembly circuit for processing by the pod processor 1420 and mobile device 710, as applicable. The handle circuit 1910 also optionally transfers power 2292 to the base assembly circuit 1240 for use by the module and mobile device. Also shown is a beeper (and/or vibrator) 1920 in the handle 1810.

Notably, the base assembly circuit and charging circuit are adapted to both transmit power to the mobile device and to receive power from the mobile device (for example, when the on-board battery is running low) to maintain operation of the overall module, or at least, to allow for an automatic graceful shutdown of the module and preservation of stored/acquired data. The ability to perform two-way power transfer is a feature of various mobile devices.

Figure 23:
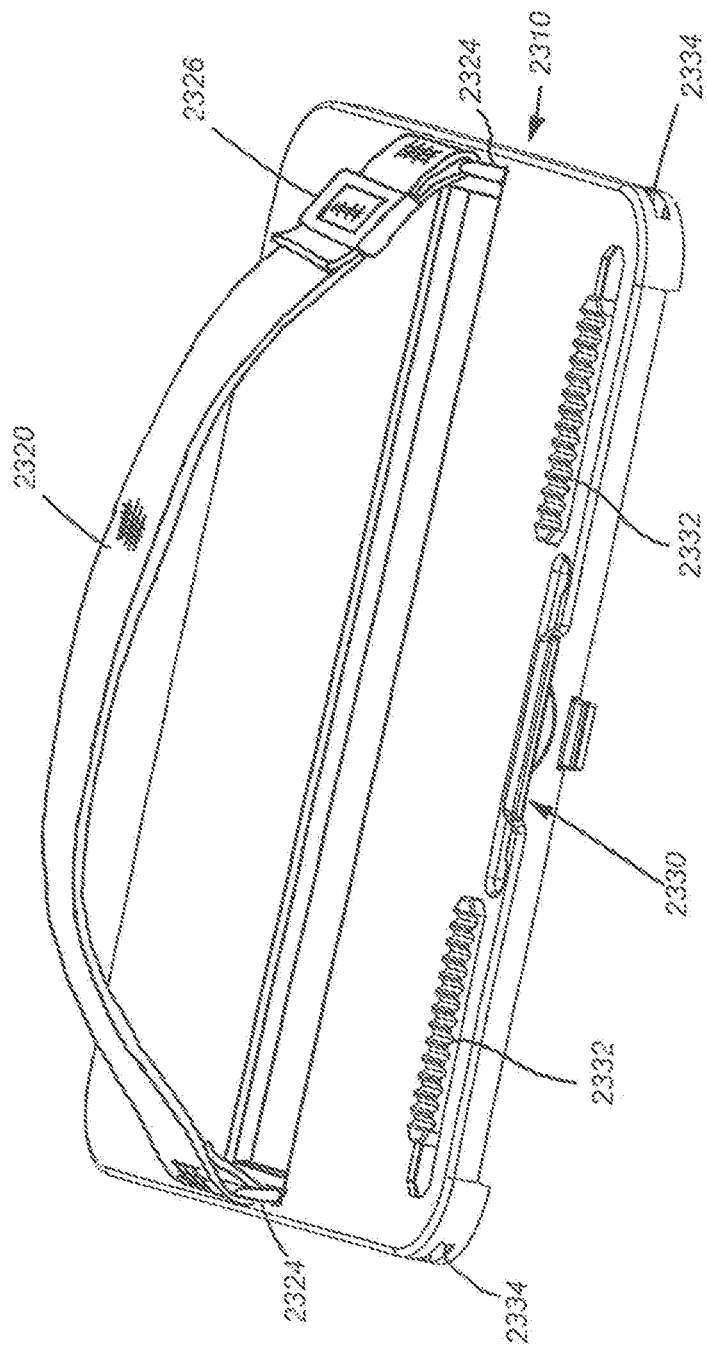
FIG. 23 is a perspective view of a battery hatch cover that can be removably attached to the image module of FIG. 7, including an optional hand strap accessory.

FIG. 23 illustrates a diagram of one of a variety of accessories, in addition to the above-described grip handle 1810, which can be attached to the module 700 using a specialized battery hatch cover 2310. His cover includes the above described unitary live-spring latch 2330, as well a sliding safety latches 2332 (with associated pockets 2334, through which ends of the safety latches project into the base assembly 720). The hatch 2310 includes a pair of base rings 2322 and 2324 that secure an adjustable hand strap 2320. The strap 2320 can be adjusted using an adjustment buckle arrangement 2326 or another acceptable mechanism. This strap arrangement is illustrative of a wide variety of possible arrangements, and is adapted to secure a user's fingers to the bottom of the module while in use free of the grip handle 1810. In alternate embodiments, the strap can be anchored by a single base ring and act in the manner of a wrist strap. Alternatively, the hatch cover can include a base with a belt clip or a lanyard—or a combination of optional features. Note, in various embodiments a universal mount (i.e. a rail, socket, etc.) can be provided to the hatch cover so that straps, mounts and/or other accessories can be readily clipped/secured to the cover as desired. Generally, such accessories can be used to hold or mount the module as appropriate to the scanning/reading application.

III. Wireless Data Transmission

Figure 24:
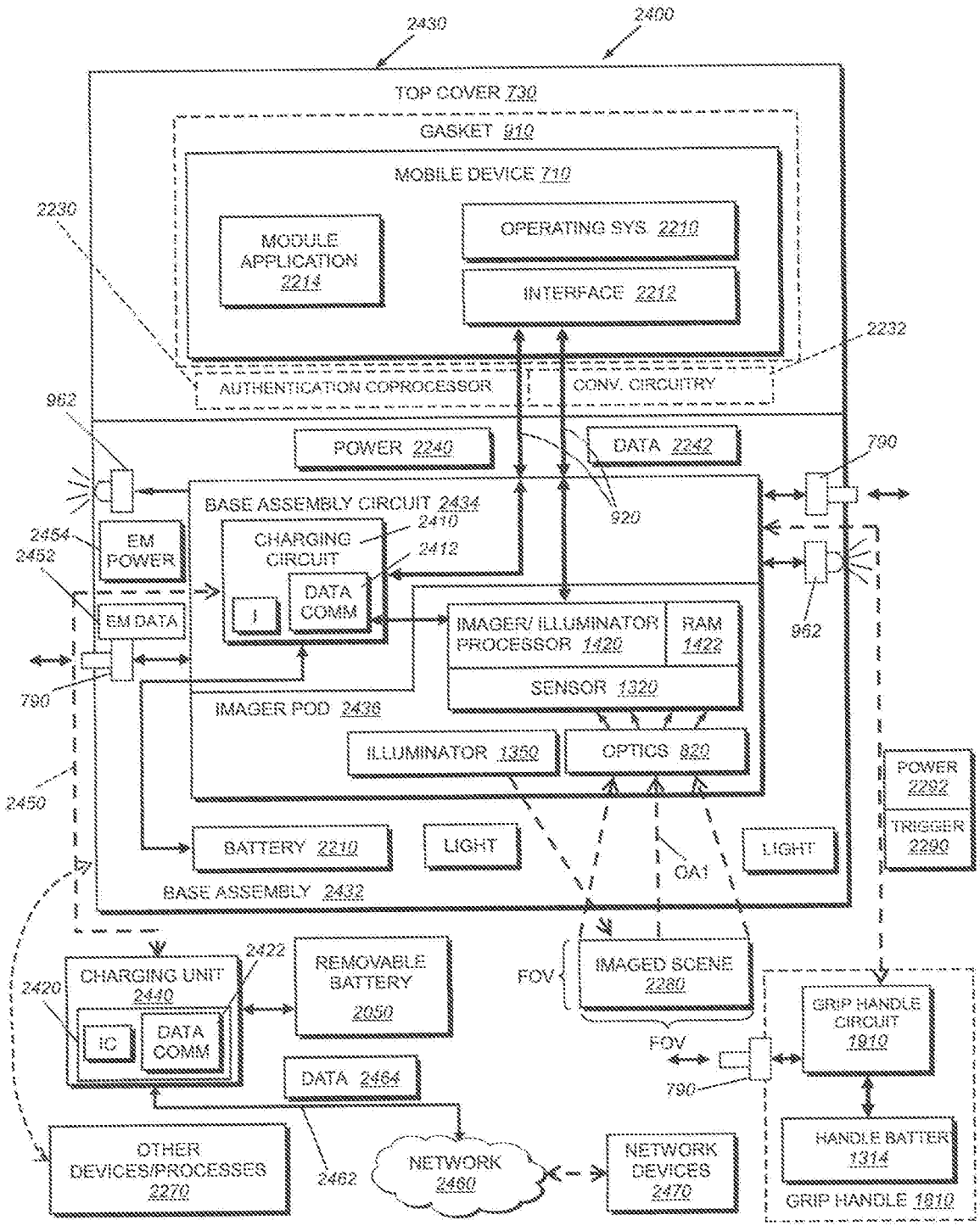
FIG. 24 is a block diagram showing functional components, processes and processor of the image module and handheld device implemented according to an of the embodiments above, in which components that facilitate wireless data communication, according to an embodiment, are integrated into the above-described wireless charging functionality.

As provided generally in the above-described embodiments, the external charging unit (charger) can be interconnected with a data network that is wireless (e.g. 802.11(g)/WiFi) or wired (e.g. LAN/Ethernet). FIG. 24 depicts an embodiment of the overall system 2400, in which the charging circuits 2410 and 2420 of respective module/base assembly (2430/2432) and charging unit (2440) are particularly arranged to transmit data in a duplex form therebetween over a wireless link 2450 between induction coils I and IC. Note that elements of the system 2400 that are structurally or functionally similar/equivalent to embodiments described above are provided with like reference numbers.

As shown in the system 2400 of FIG. 24, each charging circuit 2410 and 2420 is provided with a respective data communication module 2012 and 2422 that facilitates transmission of data 2452 in combination with the EM power transmission 2454 over the air gap. While the data communication modules 2412 and 2422 are depicted as part of the respective charging circuits 2410 and 2420, some or all of their structure and/or function can be instantiated in other parts of the overall system circuitry (e.g. within the base assembly circuit 2435 and/or imager pod 2436). Thus, the term "data communication module" (and variations thereof) should be taken broadly to include various implementations where portions of the structure/function of the circuit are located in other parts of the overall system.

As depicted, the charging unit 2440 is also interconnected with a communication network 2460 that allows for two-way (duplex) digital data communication 2464 via a link 2462 that is typically wired (e.g. Ethernet/LAN cabling), or optionally wireless (e.g. WiFi, or similar RF communication protocol). Data 2464 can be formatted in a standard network protocol, such as TCI/IP and transferred to and from other devices 2470 that reside on the network—for example, PCs, servers, laptops, tablets and smartphones. Such devices are used to receive data from modules 2430, including stored, decoded ID information and other relevant information (e.g. images of objects, features, etc.). Applications, software updates and other setup/training information (among other data) can be transmitted to the module via the network 2460. Note that network devices can include Internet-enabled devices, such as routers, access points, etc., which allow the charging unit to communicate with cloud-based data sources.

Figure 25:
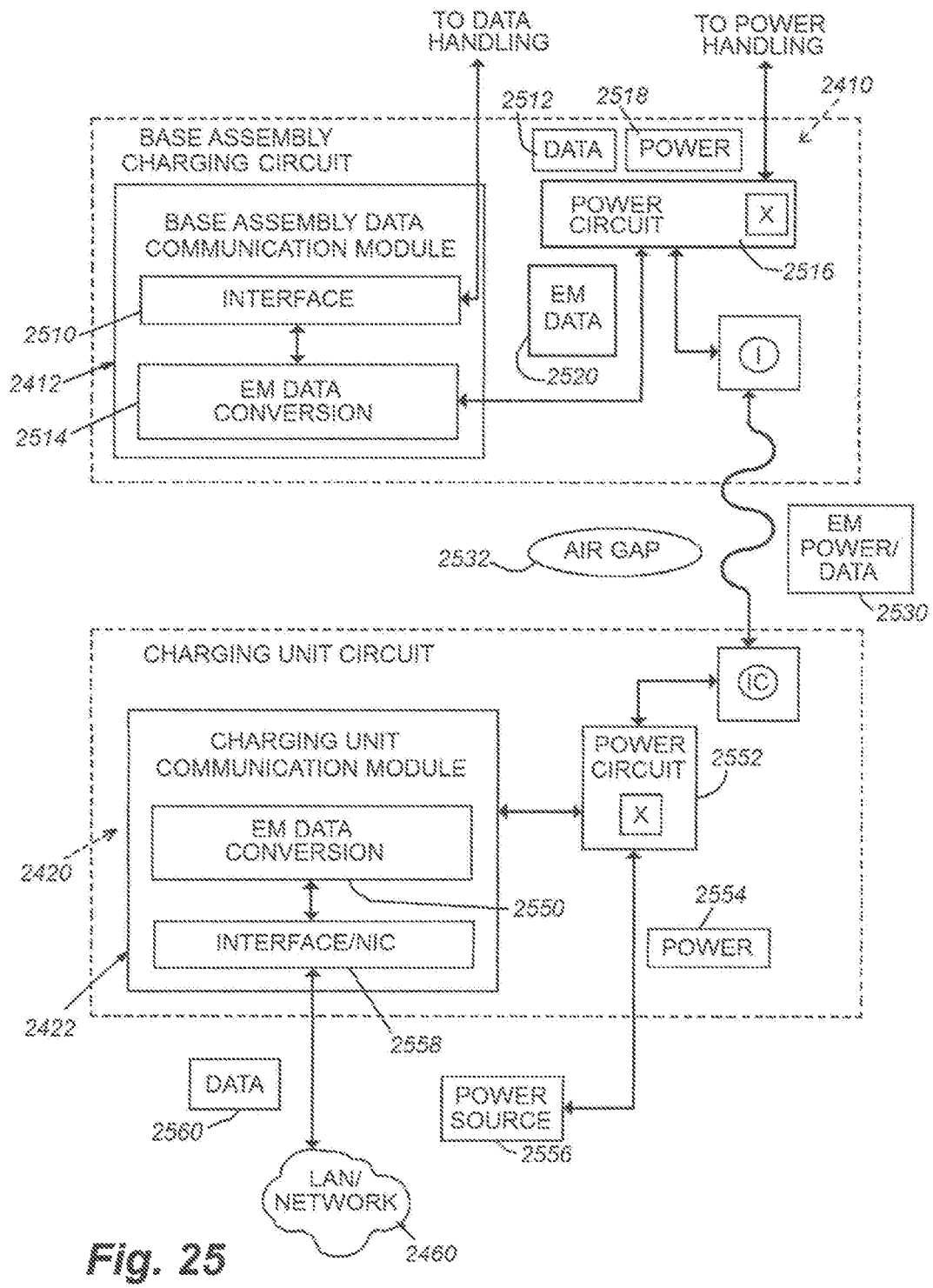
FIG. 25 is a more-detailed block diagram showing the charging and data communication.

With further reference to FIG. 25, the base assembly charging circuit 2410 and charging unit (charger) charging circuit 2420 are shown in further detail. The base assembly communication module 2412 includes an interface process (or) 2510 that manages the transmission of digital data 2512 from other sources within the module 2430, including the imager pod 2436, base assembly circuit 2434 and mobile device 710. The data 2512 can be formatted in any acceptable way—for example data packets arranged in the TCP/IP protocol or an internal device (e.g. serial or parallel bus-based) protocol. The interface 2510 transfers data to and from an EM data conversion module or process(or) 2514 that is interconnected with a power circuit 2516 that receives EM power from the base assembly induction coil I and converts into useable electrical energy 2518. This operation should be known to those of skill. This conversion can include transforming and rectifying the power as appropriate using known electrical components. The EM data conversion module 2514 injects and extracts a modulated data signal 2520 that is overlaid onto the EM power transmission signal to generate the EM signal 2530 that passes over the air gap 2532 between the base assembly induction coil I and charging unit induction coil IC.

The charging unit communication module 2422 also includes an EM data conversion module/process(or) 2550 that is interconnected to a charging unit power circuit 2552. The charging unit power circuit 2552 receives external power 2554 from an external source 2556, such as wall current (110-220 VAC), a battery, solar array, generator, etc. The power circuit 2552 transforms and converts the power into an EM power signal 2530 for delivery over the air gap 2532. The power circuit 2552 either injects an overlaid data signal provided from the EM conversion circuit 2550 or extracts an overlaid data signal from the base assembly. More generally, the power signal presents as a constant amplitude/frequency in the form of a carrier wave. EM data can be, thus, carried on this constant signal as a modulated data format (modulated for amplitude and/or frequency) using known techniques, the power circuits 2516 each include a transceiver (or transceiver function) X and XC, which facilitates the injection and extraction of the modulated part of the signal 2530. The source and destination of the EM data can be encoded into the modulated signal by the appropriate data conversion module 2514, 2550 so that the system knows the appropriate routing of data associated with that signal. In other words (and by way of example) the base assembly module extracts data that is addressed to the base assembly or mobile device, and the charging unit module extracts data that is addressed to the charging unit or a networked device. In another embodiment, each side of the EM link transmits its data waveform in turn while the other side receives the waveform.

The charging unit communication module 2422 includes an interface/network interface card (NIC) 2558 that interoperates with the EM data conversion module 2550 to receive and transmit digital data 2560 between the charging unit and a LAN or other data network 2460. The interface can operate in a conventional manner, presenting an IP address (IPV4 and/or IPV6) or other device identifier (e.g. a MAC address) to the network and to the EM data conversion module so that the charging unit is recognized both by the broader network 2460 and by the internal system components using appropriate identifiers. A similar addressing function can occur in the base assembly interface 2510.

Figure 26:
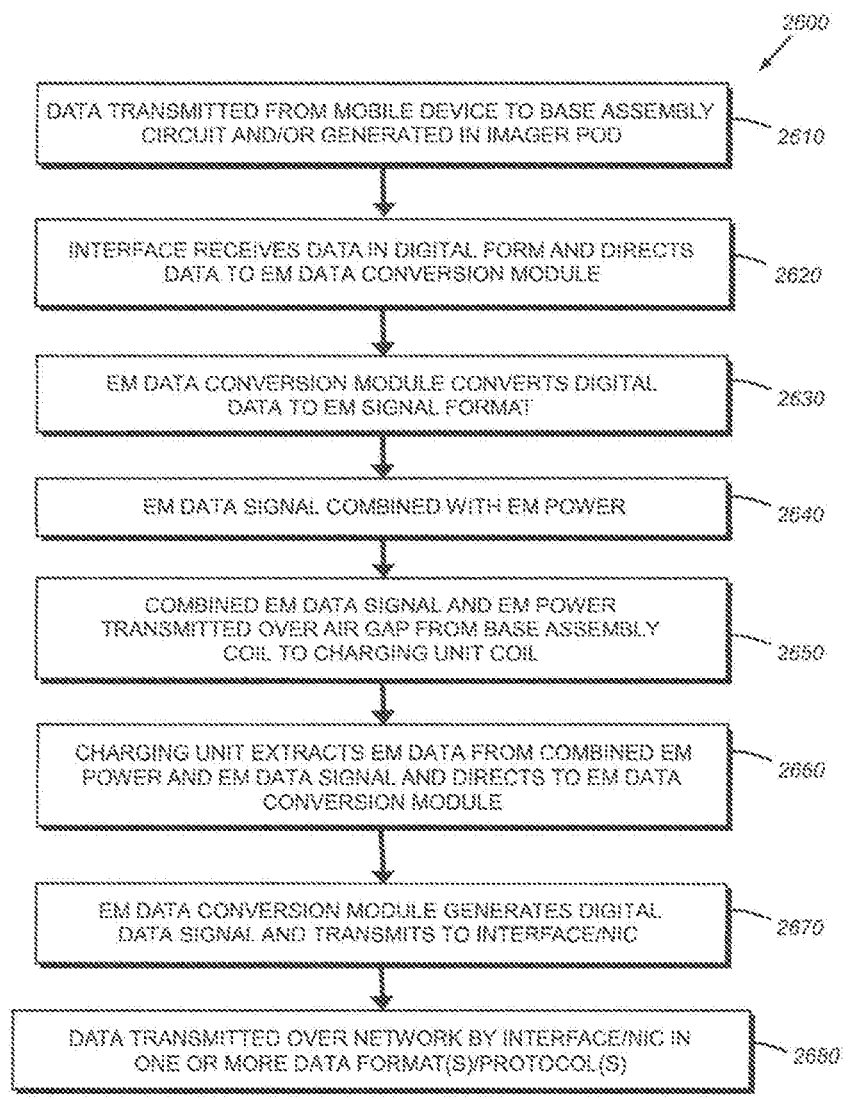
FIG. 26 is a flow diagram showing an exemplary data transmission from the image module to the wireless charging unit and interconnected network (e.g. LAN) via EM signals in accordance with the embodiment of FIG. 24.
Figure 27:
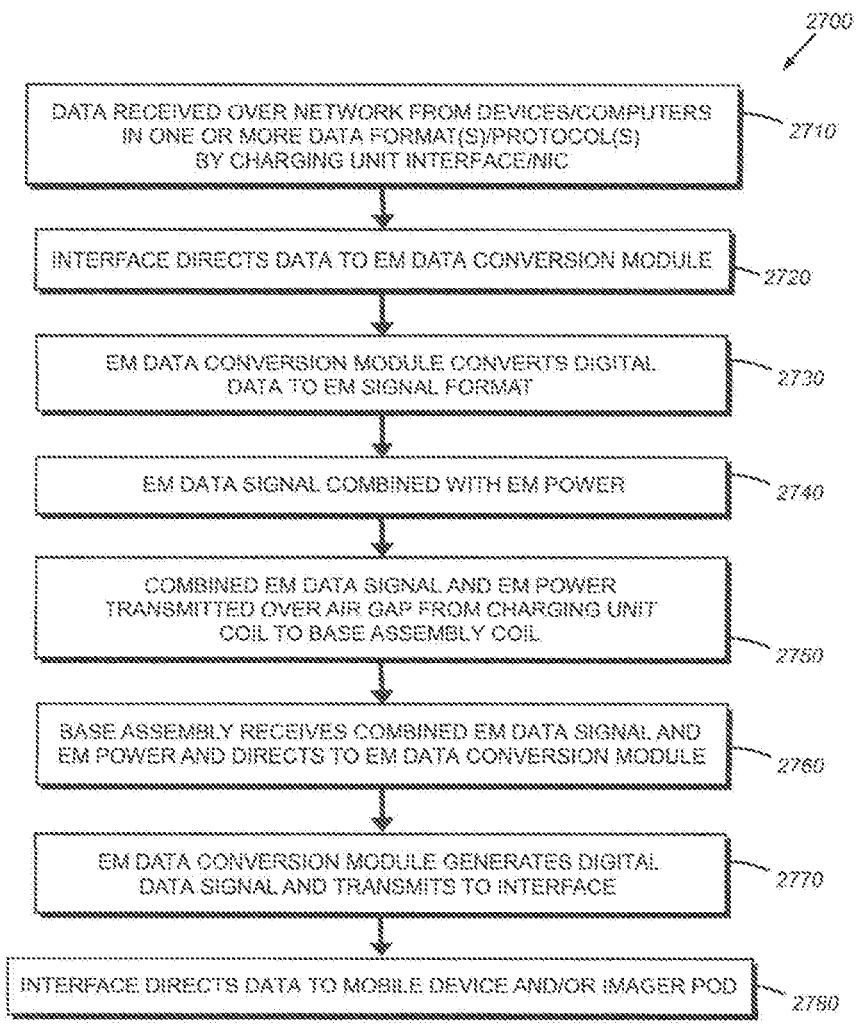
FIG. 27 is a flow diagram showing an exemplary data transmission from the wireless charging unit and interconnected network (e.g. LAN) to the image module via EM signals in accordance with the embodiment of FIG. 24.

FIGS. 26 and 27 show generalized flow charts of respective procedures 2600 and 2700 for transmitting data from the module to the charging unit/LAN and from the charging unit/LAN to the module. According to the procedure 2600 (FIG. 26), in step 2610 data is generated within the mobile device 710 (for example an app downloading stored ID data) or it is generated in the base assembly 2432 (e.g. the imager pod 2436). This data is in digital form with appropriate formatting/protocols. In step 2620 the base assembly charging circuit interface 2510 receives the data in digital form and directs the data to the EM conversion module 2514. In step 2630 the EM conversion module converts this digital data to an EM signal format and it is combined with the power signal is step 2640 by the power circuit 2516 and transceiver X. The combined power and data EM signal is transmitted over the air gap 2532, with power generally flowing from the charging unit coil IC to the base assembly coil I, while the data portion of the signal is provided as a modulated waveform. In step 2660 the charging unit, via the induction coil IC and transceiver XC extracts EM data from the combined EM data and power signal, and directs the EM data signal to the data conversion module 2550. The EM data conversion module 2550 then converts the signal into digital data and transmits it to the interface/NIC 2558 in step 2670. The network interface 2558 transmits the data in an appropriate format/protocol over the network 2460 in step 2680.

In the procedure 2700 (FIG. 27), the network 2460 provides data from a remote device in one or more formats/protocols, which is received by the charging unit interface/NIC 2558 in step 2710. In step 2720, the interface 2558 directs this received digital data to the EM data conversion module 2550, where it is converted to an EM signal/waveform (step 2730). In step 2740, the EM data signal is injected into/combined with the EM power signal provided by the power circuit 2552. The transceiver XC transmits the EM data signal along the power signal to the charging unit induction coil, and this passes over the air gap 2532 to the base assembly induction coil I (step 2750). The base assembly transceiver X extracts the EM data signal and directs it to the EM data conversion module 2514 in step 2760. The conversion module 2514 then generates digital data from the EM data, and transmits this data to the interface 2510. In step 2780, the interface directs the data to the mobile device 710, base assembly circuit 2434 and/or imager pod 2436 (or other functionalities associated with the overall module 2430).

It should be clear that the above-described steps can be varied, in a manner known to those of skill in the art and that the sequence of operations and modalities used to perform these steps are by way of example. Those of skill can appreciate that there are many available techniques for converting data from an EM waveform to a digital stream and for ordering duplex communication between devices. Additionally, a variety of interfaces can be employed to operate the transmission of data between the module and the charging unit. A remote, networked device can request download of information via the wireless charging circuit through a web page or application GUI running on the remote device. The mobile device application can include a button or other function that enables data transmission via the wireless charging circuit. Likewise a physical button can be located on the base assembly and/or charging unit to facilitate data transmission. Also, an appropriate interface can direct that data be transmitted/downloaded whenever the base assembly is cradled in the charging unit, and a useable connection between induction coils is present.

IV. Wireless Connection of Base Assembly and Mobile Device

As described above, certain mobile device connector architectures and communication protocols are problematic in providing a useable platform for data communication between the base assembly and mobile device. Likewise, making a physical data connection between the handheld device and base assembly can be problematic and subject to failure or degradation over time. It is recognized that various wireless communication modalities (transceivers) and associated protocols, such as 802.11 and Bluetooth®, are typically native on mobile devices, such as the Apple iPhone, Galaxy® Series (by Samsung of Korea), etc. These communication modalities employ (generally) open protocols that allow data to pass freely between devices.

Figure 28:
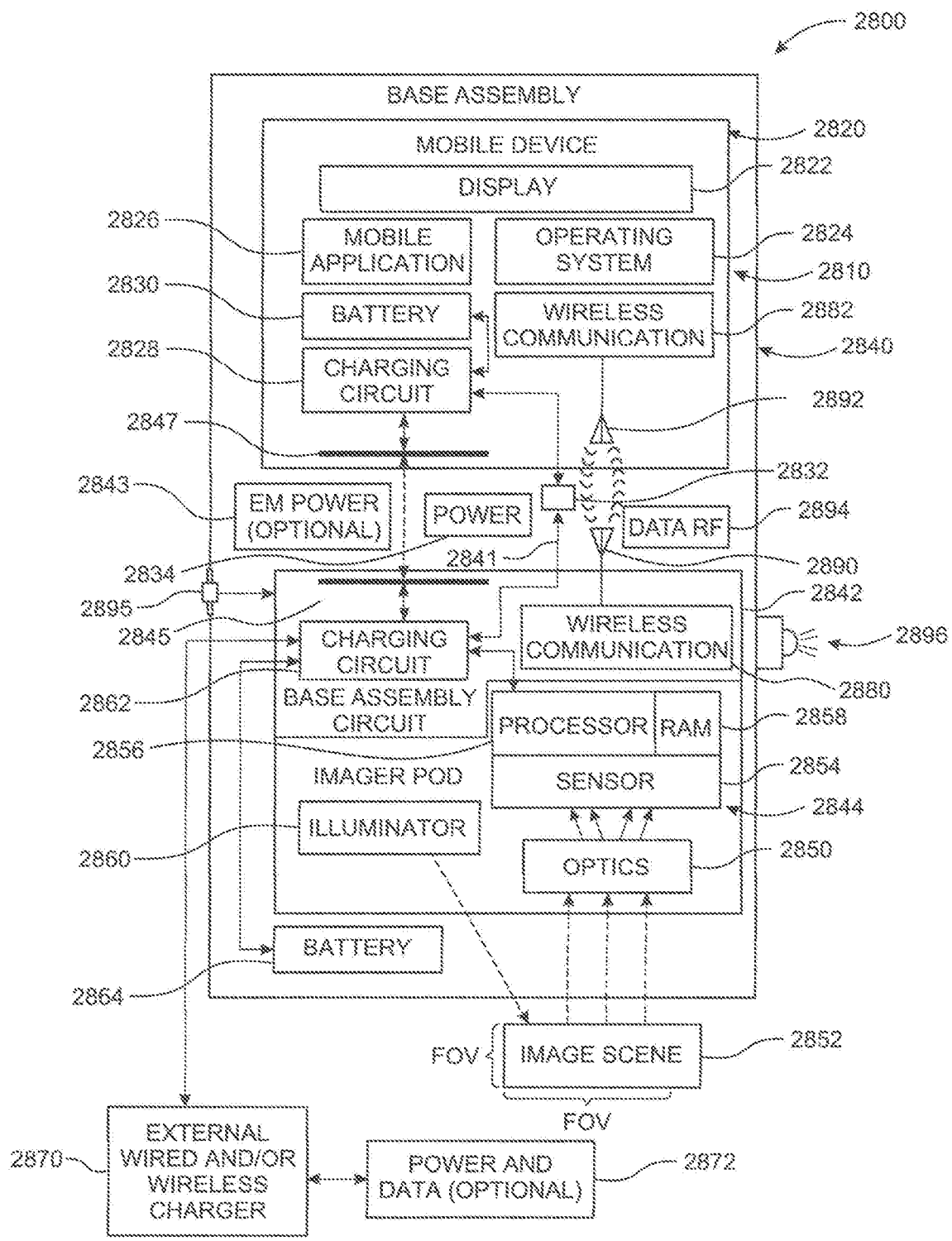
FIG. 28 is a block diagram showing the functional components, processors and processes of a mobile device mounted with respect to the image module base assembly, in which the module and base assembly communicate via an RF link, according to an exemplary embodiment.

Reference is made to FIG. 28, which shows a diagram of the overall system 2800 according to an illustrative example. The system 2800 can operate to acquire and process image data in accordance with the principles described with reference to FIG. 24, above. Additional components (not shown) that are functionally similar or identical to those provided in the above-described embodiments can be included in the system 2800 in various operational examples. As shown, the system 2800 includes a base assembly 2810, which is adapted to receive a mobile device 2820, such as a smartphone (e.g. iPhone®, Samsung Galaxy®, etc.) or similar handheld/mobile computing and communication device. The base assembly 2810 includes appropriate covers, gaskets, etc. (as described above), for securing and sealing the mobile device with respect thereto, while allowing the display screen 2822 to be viewed and operated by the user. It also includes a processor architecture with an operating system 2824 and one or more mobile applications 2826, which perform the tasks associated with the system and method herein. Additionally, the mobile device includes a charging circuit 2828 that interacts with the operating system 2824 and manages power handling relative to an on-board battery unit 2830. The battery unit 2830 can be recharged based upon a wired charging arrangement that carries power 2834. Wired charging can be implemented via a connector 2832. Such a connector can comprise, for example, the well-known Lightning® connector used by Apple, or a standard micro USB connector (2832). In an exemplary embodiment, the well or mount (retaining component above) that holds the mobile device can include a fixed connector onto which the mobile device connects when it is secured in the base assembly housing 2840. Alternatively, the well can include a short wire 2841 that carries the connector 2832 on its distal end. The connector is plugged into the receptacle on the mobile device before seating the mobile device in the well.

Alternatively, charging of the mobile device can occur using EM energy 2843. EM energy 2843 is transmitted from the base assembly housing 1840 to the mobile device 2820 using respective, confronting induction coils 2845 and 2847 (also termed "charging pad(s)") of appropriate size and configuration. The base assembly and mobile device coils 2845 and 2847 are operatively connected/controlled by respective charging circuits 2862 (described below) and 2828. The base assembly coil 2845 can be located in the well of the housing 2840 so that it overlaps the mobile device coil 2828—which is typically located along the back face of the device. In general, a wide variety of commercially available smartphones presently include an integrated induction coil for wireless charging. The base assembly coil 2845 is located and tuned to energize this integrated coil (2847).

The base assembly 2810 housing 2840 supports a base assembly circuit 2842 and an associated imager pod 2844, the function of which is describe above with reference to previous embodiments. In general, the imager pod includes optics 2850 that focuses light received from an imaged scene 2852, within a field of view (FOV), onto an image sensor 2854. The received image data is processed by a processor 2856 and associated memory 2858. An illuminator 2860 projects light onto the scene 2852 in a manner described above. Associated applications and procedures/modules are operated by the processor 2856 to perform image processing and related tasks. One related task is control of the base assembly's charging circuit 2862, which manages power relative to an on-board base assembly battery unit 2864. Power handling can operate in a manner described above. Charging of the base assembly battery 2864 can be accomplished using any appropriate external charging unit 2870, such as a cradle that receives the base assembly housing and engages direct contact-based connections to a power source (e.g. AC wall current). Alternatively, the cradle can include an inductive/wireless charging unit, such as that shown and described with reference to FIG. 24. This charging unit 2870 can support optional data handling capabilities between an external network and the base assembly 2810, as described above.

Notably, the base assembly circuit 2842 further provides a wireless transmitter and receiver circuit 2880 configured in accordance with one or more known communication standard(s) (e.g. WiFi, 802.11(g) and/or Bluetooth®). The standard(s) are compatible with those used by a transmitter/receiver circuit 2880 integrated with the mobile device 2820. This circuit 2882 is typically part of the mobile device's commercially available wireless communications capability. Each transmitter/receiver circuit 2880 and 2882 is operatively connected to an antenna 2890 and 2892, respectively, of appropriate shape, size and design to facilitate the desired frequency(ies) and data rate for RF-based data 2894 passing between the mobile device 2820 and base assembly 2810. The mobile device antenna 2892 is located at a predetermined position within the housing of the device 2820 in accordance with the device manufacturer's specification. The base assembly antenna 2890 can be located at a position within the housing 2840 that allows for relatively interference-free data transmission between antennas 2890, 2892. The optimization of such antenna placement should be clear to those of skill in the art. In general, placing the base assembly antenna 2890 at a location in the housing 2840 relatively close to the mobile device antenna 2892 should facilitate a good transmission link. The housing 2840 can also include shielding to prevent RF interference or unwanted reflections in a manner also clear to those of skill.

In the example of Bluetooth® wireless communication to carry the RF data 2894, the data rate is generally sufficient to allow a string of the ID code data (typically 1-2 kilobytes) to be transferred in a short time frame from the imager pod 2844 to the application 2826 on the mobile device. Likewise, configuration data and setting changes can be transmitted over the RF link from the mobile device application 2826 to the base assembly circuit/processor 2842—and such setting/configuration data can typically transmit over a longer timeframe, as it is changed less often and/or at runtime startup. Where firmware on the base assembly is to be updated it is first received from a WAN or other network via the mobile device's WiFi connection. Thereafter, the firmware update is transmitted using the RF link (data 2894) under control of the application 2826 to the base assembly 2810. Alternatively, firmware updates can be received via the base assembly charging cradle as described above.

As shown in FIG. 28, the base assembly housing 2840 can include various function buttons, such as a trigger 2895 (for image acquisition/decoding) and indicators (lights and/or alphanumeric displays) 2896. The indicator 2896 can include (e.g.) a green/red light to indicate successful/unsuccessful reading of an ID code and an RF link active light (for example a continuous and/or flashing blue light), that informs the user when the RF link has been activated between antennas 2890 and 2892. For example, when the light is off, it can indicate that no link exists. A solid, on light indicates an active RF link. A flashing light—in various patterns—can indicate that link initiation is in progress (e.g. slow flash), or that there is a problem establishing an active RF link (e.g. rapid flash), such as when a Bluetooth® link has already been established between the mobile device 2820 and a another device/peripheral (e.g. headphones). In general, the user may be required to disconnect an interfering application or peripheral before establishing the link with the base assembly and subsequently ensure that an extraneous link is not reestablished during runtime.

Figure 29:
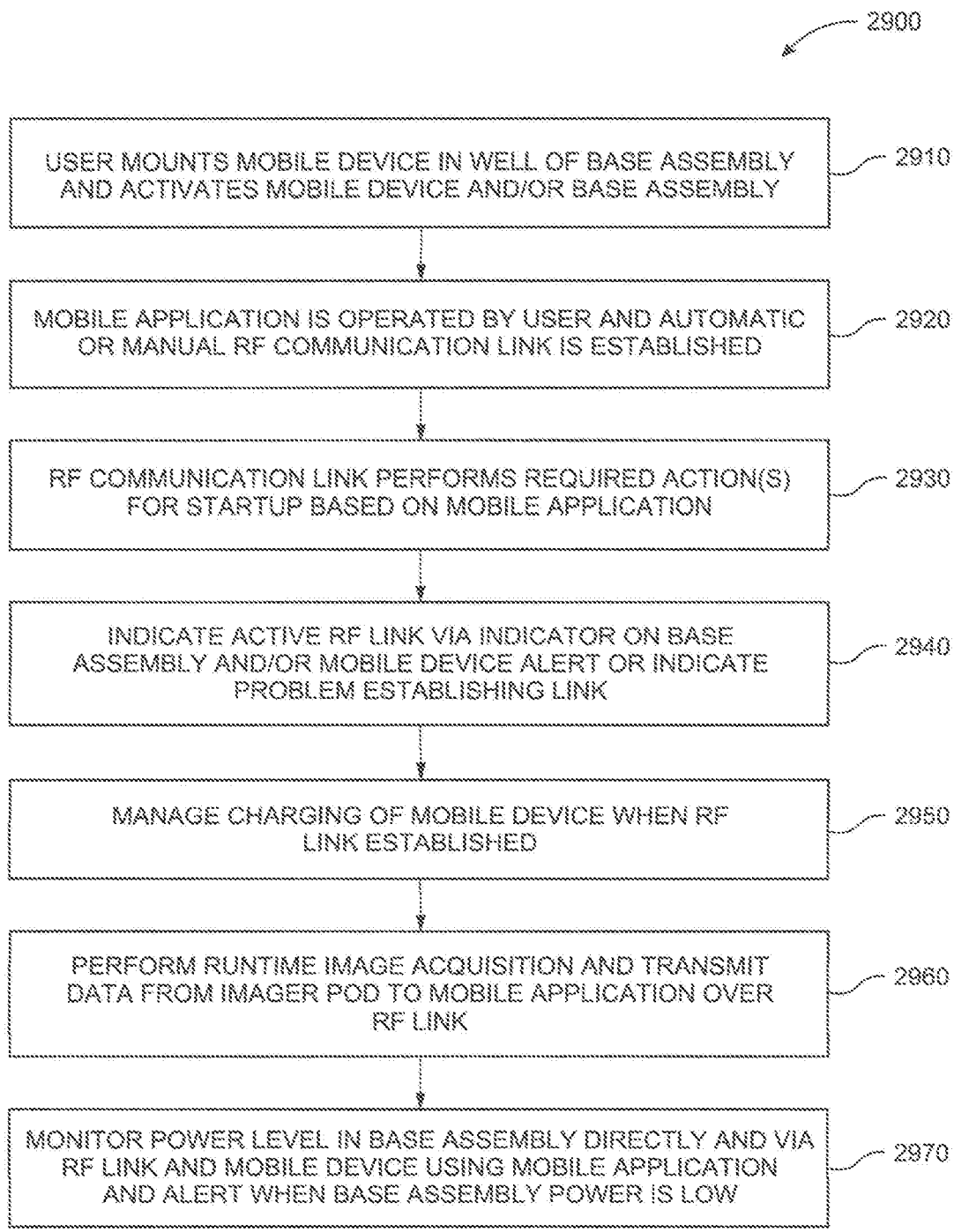
FIG. 29 is a flow diagram showing a procedure for startup and runtime operation of the mobile device and image module according to FIG. 28.

Reference is now made to the procedure 2900 of FIG. 29, which shows startup and runtime operation of the vision system arrangement 2800 in accordance with FIG. 28. The user initially mounts the mobile device within the well of the base assembly housing and makes the power connection using a physical connector (Lightning®, micro USB, etc.), or enables inductive charging as described above. Either upon mounting, or subsequently, the user starts the system by switching on the mobile device, opening the mobile application and/or switching on the base assembly using an appropriate switch or button (step 2910). When the mobile application is activated, it either prompts the user to manually operate the RF communication feature on the device (e.g. open Bluetooth®) or it automatically operates the RF feature on the mobile device. Any handshake and other actions to establish the RF link between the mobile device and the base assembly are then performed in step 2930. In step 2940, if the link is successfully established, then the mobile application (e.g. via the device display) and/or the base assembly (e.g. using a solid blue indicator light) alerts the user that the connection is active. If the connection fails, then the mobile application and/or base assembly alerts the user (e.g. a flashing light or differently colored light on the base assembly housing).

Once the RF link is established, the mobile application can also manage charging of the mobile device by the base assembly via the wired/wireless charging arrangement in step 2950. The vision system is then ready to perform runtime image acquisition and ID decoding as triggered by the user. Acquired image data and/or ID code data is transmitted over the RF link from the imager pod to the mobile application on the mobile device in step 2960. At this time, any firmware updates that are stored on the mobile device can be transmitted to the base assembly under management of the mobile device, and in association with an exchange of control data with the base assembly processor. Similarly, and configuration and settings data can be transmitted from the mobile device to the base assembly at the appropriate time via the RF link. The mobile device and/or base assembly monitors the power level in the base assembly battery and indicates (using indicators on the base assembly housing and mobile device display) when power is low and the base assembly requires recharging (step 2970).

Note that the base assembly described above can define a variety of form factors. As described above, a base assembly with a recess for receiving the handheld/mobile device/smartphone can be employed. Optionally, a subframe that is removably receivable within the main body can be provided. The subframe can be adapted to receive and retain the device. Alternatively, the main body can directly receive the device in an appropriate well or recess. In an example, the processor circuitry is located within the main body and generates processed image data. The processor circuitry is operatively connected to a battery within the main body. An imager module (pod) is also located on the main body and is operatively connected with the processor circuitry. The imager module arranged to acquire images of a scene and transmit image data to the processor circuitry. In an example, the imager module includes a semi-cylindrical shell that allows for rotation of an optical axis of the imager module with respect to a longitudinal axis of the main body.

V. Conclusion

It should also be clear that the handheld vision system module described herein affords the user with a versatile, durable and robust tool for ID-decoding and other vision system processes that lend themselves to handheld devices. It allows for native device functions, such as imaging and communications to be employed while the device is mounted in the module, and such native functions can be advantageously triggered and controlled, at least in part, by one or more buttons on the module body itself. It also allows the module to be used with a variety of device form factors—by swapping either subframes or top covers and gaskets (termed collectively herein as "retaining component(s)")—and enables upgrade to newer versions of the same device make as the form factor changes (i.e. a new model release). Various embodiments also allow for versatile form factors, including those employing a grip and trigger arrangement. Moreover, the embodiments herein effectively facilitate data transmission in addition to wireless power transmission, increasing the versatility of the overall system. More particularly, the use of wireless data transmission combined with a networked charging unit allows for use of the module in environments with limited RF availability (due to range, interference, jamming, etc.) and, where removably wired connections (e.g. plug chargers/data jacks) can become fouled due to the conditions, such as outdoor environments, industrial environments, etc. It should also be clear that the above-described system allows for charging of the mobile device by the base assembly using either a transparent wireless technique or via a simplified protocol—e.g. the Apple Qi standard—while a ubiquitous RF data transmission protocol (e.g. Bluetooth®) establishes a wireless connection without (free of) the use of a physical cable, thereby improving overall durability of the device and enabling easier/faster attachment of the mobile device/smartphone to the base assembly.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein the terms "process" and/or "processor" should be taken broadly to include a variety of electronic hardware and/or software based functions and components. Also, as used herein various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, it is expressly contemplated the form factor of the module can vary from the somewhat rectangular box shape of the illustrative embodiment, and include a variety of curvilinear forms, projections and/or protuberances. The module can also include additional interface devices, such as LCD display screens and/or readouts, and the like. Moreover, while the illustrative body/frame can be adapted to receive a plurality of differing mobile device makes, models and form factors, it is contemplated that different bodies/frames and associated subframes can be provided to accommodate differing sized and shaped mobile devices—for example, a body with a larger recess and associated subframe can be provided for the popular Samsung Galaxy® series of smartphones. Also, while the illustrative application described herein refers to ID reading/decoding, other imaging and vision system functions can be performed by the system in further embodiments—for example, OCR processes, package sizing and acquisition of overall package images (and labels thereon) for use in their cataloging and/or identification. Accordingly, this description is meant to be taken only by way of example, and not to otherwise limit the scope of this invention.

What is claimed is:

1. A handheld vision system module comprising:
   a base assembly adapted to receive and retain a handheld mobile device;
   processor circuitry located within the base assembly, the processor circuitry arranged to generate processed image data;
   a battery, operatively connected with the processor circuitry, located within the base assembly;
   an imager pod located relative to the base assembly, and operatively connected with the processor circuitry, the imager pod arranged to acquire images of a scene and transmit image data to the processor circuitry, the imager pod including an illumination assembly configured to project light of a predetermined wavelength range into a translucent light pipe structure comprising a plurality of rounded lenses, the imager pod including a shell allowing for rotation of an optical axis of the imager pod with respect to a longitudinal axis of the main body;
   an application running on the mobile device that allows receipt of, and manipulation of, the image data, monitors a power level of the base assembly, and generates an indication that the base assembly requires recharging;
   a charging circuit connected to at least one of a charging connector or a wireless charging pad, operatively connected with the battery on the base assembly, constructed and arranged to charge a battery of the mobile device;
   an RF communication circuit and antenna operatively connected with the processor circuitry on the base assembly that is adapted to transmit the image data from the imager pod to an RF communication circuit having an antenna on the mobile device and is adapted to receive settings and configuration for the base assembly from the application running on the mobile device.

2. The handheld vision system as set forth in claim 1 wherein the RF communication circuit employs at least one of a communication protocol based upon at least one of WiFi, 802.11 and Bluetooth®.

3. The handheld vision system as set forth in claim 1 wherein the charging connector is a micro USB connector or a connector that defines an Apple-based form factor.

4. The handheld vision system as set forth in claim 3 wherein charging of the Apple based connector is controlled in accordance with a Qi standard using the processor circuitry.

5. The handheld vision system as set forth in claim 3 wherein the connector is mounted in a fixed relation to the base assembly or is mounted on a wire attached to the base assembly.

6. The handheld vision system as set forth in claim 1 wherein the battery in the base assembly is rechargeable and further comprising a charging circuit in a cradle that recharges the battery from an external power source, and wherein the charging circuit is operatively connected to at least one of (a) an induction coil mounted on the base assembly, wherein the external charger has an induction coil that selectively transmits energy to the induction coil mounted on the main body and (b) a connector mounted on the base assembly, wherein the external charger has a connector that removably docks with the connector on the base assembly to transmit power therebetween.

7. The handheld vision system as set forth in claim 1 wherein the processor circuitry has an image processor having an ID-decoding process, the imager pod comprising an imager pod circuit comprising an imager processor being located in combination with an image sensor and optics in the imager pod.

8. The handheld vision system as set forth in claim 1 wherein the imager pod has, at least, an integral optics and the illumination assembly, the illumination assembly including at least one of a scene illuminator and an aimer assembly.

9. The handheld vision system as set forth in claim 1 wherein the base assembly defines either (a) a recess with an inner perimeter or (b) a formed gasket with a lip that surrounds at least a portion of the mobile device, wherein a touchscreen of the mobile device is exposed for a user to operate.

10. The handheld vision system as set forth in claim 1 wherein the base assembly has at least one of (a) an indicator that shows as status of a communication link between the RF communication circuit on the base assembly and the RF communication circuit on the mobile device and (b) successful or unsuccessful decoding of an ID code in the image scene.

11. The handheld vision system as set forth in claim 1 further comprising at least one of an image-acquisition trigger and a function button located on the base assembly and operatively connected to the processor circuitry, constructed and arranged to operate at least one of the imager pod and the mobile device.

12. The handheld vision system as set forth in claim 1 wherein the imaged scene has at least one ID code, and at least one of the processor circuitry and the mobile device module application is constructed and arranged to decode the ID code and generate information related thereto that is transmitted by the RF communication circuitry and the antenna for the base assembly.

13. The handheld vision system as set forth in claim 1 wherein the application is arranged to transmit information related to the image data over a wireless link using a transceiver located in the mobile device to a remote network.

14. The handheld vision system as set forth in claim 1 further comprising a grip handle assembly with a trigger switch removably attached and operatively connected to the base assembly.

15. A handheld vision system module comprising:
    a main body having a main body inner edge that defines, at least in part, a main body top recess;
    processor circuitry located within the main body, the processor circuitry arranged to generate processed image data;
    a battery, operatively connected with the processor circuitry, located within the main body;
    an imager module located on the main body and operatively connected with the processor circuitry arranged to acquire images of a scene and transmit image data to the processor circuitry, the imager module including an illumination assembly configured to project light of a predetermined wavelength range into a translucent light pipe structure comprising a plurality of rounded lenses, the imager module including a shell allowing for rotation of an optical axis of the imager module with respect to a longitudinal axis of the main body;
    a handheld mobile device having a first device form factor removably attached with respect to the main body and receiving power from the battery, the handheld mobile device having an application that monitors a power level of the main body and generates an indication that the main body requires recharging; and a charging circuit, operatively connected with the battery on the main body, constructed and arranged to charge a battery of the handheld mobile device, and wherein the charging circuit is connected to at least one of a charging connector and a wireless charging pad;

an RF communication circuit and antenna operatively connected with the processor circuitry on the main body that is adapted to transmit the processed image data from the imager module to an RF communication circuit having an antenna on the handheld mobile device and is adapted to receive settings and configuration for the main body from the application running on the mobile device.

16. The handheld vision system module as set forth in claim 15, further comprising a subframe having a subframe outer perimeter and a subframe inner perimeter that defines, at least in part, a subframe top recess, the subframe being is removably receivable within the main body inner edge and main body top recess, the subframe being adapted to receive and retain the handheld mobile device within the subframe top recess.

17. The handheld vision system module as set forth in claim 15 wherein the RF communication circuit employs at least one of a communication protocol based upon at least one of WiFi, 802.11 and Bluetooth®.

18. The handheld vision system as set forth in claim 1 wherein the plurality of rounded lenses comprise semi-dome-shaped lenses.

19. The handheld vision system as set forth in claim 18 further comprising a plurality of crenelated diffusers disposed along a perimeter of the light pipe.

* * * * *